United States Patent
Han et al.

(10) Patent No.: US 8,611,964 B2
(45) Date of Patent: Dec. 17, 2013

(54) MOBILE TERMINAL AND METHOD OF CONTROLLING THE SAME

(75) Inventors: Seungheon Han, Seoul (KR); Sunghyun Cho, Seoul (KR); Hyosang Kim, Seoul (KR); Hannah Na, Seoul (KR); Sukhyun Lim, Seoul (KR); Hakil Kim, Seoul (KR); Jeongmin Kwak, Seoul (KR)

(73) Assignee: LG Electronics Inc., Seoul (KR)

( * ) Notice: Subject to any disclaimer, the term of this patent is extended or adjusted under 35 U.S.C. 154(b) by 260 days.

(21) Appl. No.: 13/089,223

(22) Filed: Apr. 18, 2011

(65) Prior Publication Data

US 2011/0294549 A1 Dec. 1, 2011

(30) Foreign Application Priority Data

May 31, 2010 (KR) .................. 10-2010-0050960

(51) Int. Cl.
*H04M 1/00* (2006.01)
(52) U.S. Cl.
USPC ....... 455/566; 455/41.2; 455/550.1; 455/90.3
(58) Field of Classification Search
USPC ................. 455/566, 41.2, 466, 550.1, 90.3
See application file for complete search history.

(56) References Cited

U.S. PATENT DOCUMENTS

| | | | |
|---|---|---|---|
| 5,592,546 A | 1/1997 | Takahashi | |
| 7,289,614 B1 * | 10/2007 | Twerdahl et al. | 379/142.01 |
| 7,336,928 B2 * | 2/2008 | Paalasmaa et al. | 455/41.2 |
| 8,280,437 B2 * | 10/2012 | Haitani et al. | 455/556.2 |
| 2005/0085274 A1 * | 4/2005 | Lee | 455/566 |
| 2008/0055263 A1 | 3/2008 | Lemay et al. | |
| 2008/0125148 A1 * | 5/2008 | Zhao et al. | 455/466 |
| 2008/0305764 A1 * | 12/2008 | Walter et al. | 455/405 |

FOREIGN PATENT DOCUMENTS

EP 1879359 1/2008

OTHER PUBLICATIONS

Samsung Electronics, "GT-S5230 user manual", Retrieved from the Internet: URL:http://downloadcenter.samsung.com/content/UM/200905/20090526153814125/CMS_-_S5230_UM_OPEN_Eng_FINAL_Rev.1.1_090420.pdf [retrieved on Sep. 29, 2011], Apr. 2009, XP002660234.

* cited by examiner

*Primary Examiner* — Temica M Beamer
(74) *Attorney, Agent, or Firm* — Lee, Hong, Degerman, Kang & Waimey

(57) ABSTRACT

A mobile terminal is provided. The mobile terminal includes a display and a controller, where the controller is configured to divide at least a part of the display into a first area for displaying at least one other party information item and a second area for displaying communication log information corresponding to the at least one other party information item, display at least one communication content corresponding to one of the at least one other party information item when a signal for selecting the one of the least one other party information item is received, and display at least one communication content belonging to one of at least one communication category of the communication log information when a signal for selecting the communication log information is received.

25 Claims, 30 Drawing Sheets

Dorothy Evans

| | | number of event times | key number |
|---|---|---|---|
| 💬 | 010-9999-2523 | 5 | ✓ |
| @ | oeih@gmail.com | 3 | |
| t | @hanssedg | 1 | |

MOBILE TERMINAL AND METHOD OF CONTROLLING THE SAME

CROSS-REFERENCE TO RELATED APPLICATIONS

Pursuant to 35 U.S.C. §119(a), this application claims the benefit of earlier filing date and right of priority to Korean Application No. 10-2010-0050960, filed on May 31, 2010, the contents of which are hereby incorporated by reference herein in its entirety.

BACKGROUND OF THE INVENTION

1. Field of the Invention

The present invention is directed to a mobile terminal and a control method thereof. More particularly, the present invention is directed to a mobile terminal and a control method for displaying communication contents, such that the communication contents correspond to information selected from other party information items displayed in a first region of a display or communication log information displayed in a second region of the display.

2. Discussion of the Related Art

As the functions of terminals, such as personal computers, laptop computers, cellular phones and the like are diversified, the terminals are constructed in the form of multimedia players having multiple functions including capturing pictures or moving images, playing music, moving image files, playing games and receiving broadcasting programs. Terminals can be classified as mobile terminals and stationary terminals. Furthermore, the mobile terminals can be classified as handheld terminals and vehicle mount terminals according to whether users can carry the terminals on their person.

Improvements to the structural parts and/or the software of the terminal can be achieved by supporting and enhancing the functions of a terminal. A variety of recent terminals including mobile terminals are providing more complex and numerous functions.

SUMMARY OF THE INVENTION

The present invention is directed to a mobile terminal and controlling method thereof that substantially obviate one or more problems due to limitations and disadvantages of the related art.

In one aspect of the invention, a mobile terminal includes a display configured to display information and a controller. The controller can be configured to divide at least a part of the display into a first area for displaying at least one other party information item and a second area for displaying communication log information corresponding to the at least one other party information item, display at least one communication content corresponding to one of the at least one other party information item when a signal for selecting the one of the least one other party information item is received, and display at least one communication content belonging to one of at least one communication category of the communication log information when a signal for selecting the communication log information is received.

It is contemplated that each of the at least one other party information item includes identification information for identifying a user of a specific other electronic device, and the communication log information includes a list of communications performed between a user of the mobile terminal and the user of the specific other electronic device.

It is contemplated that the identification information includes at least a picture, a video, a caricature or a name, and the list of communications includes at least a list of calls, a list of messages or a list of messages uploaded to a social network service (SNS).

It is contemplated that the controller is further configured to display at least one communication category selecting button in a third area of the display to enable input of a selection signal for displaying the communication log information by communication categories.

It is contemplated that the controller is further configured to arrange the at least one other party information item based on a time when a corresponding one of the at least one communication content is received or transmitted.

It is contemplated that the controller is further configured to arrange the at least one other party information item that corresponds to a user of another electronic device based on a frequency of transmitting or receiving a corresponding one of the at least one communication content to or from the user of the another electronic device.

It is contemplated that the controller is further configured to simultaneously transmit each of the at least one communication content belonging to a corresponding one of the at least one communication category to a user of another electronic device corresponding to one of the at least one other party information item.

It is contemplated that the controller is further configured to select the corresponding one of the at least one communication category according to transmission information received from a user of the mobile terminal.

It is contemplated that the controller is further configured to display at least one icon on the display while the transmission information is received, such that each of the at least one icon represents a corresponding one of the at least one communication category.

It is contemplated that the controller is further configured to receive a number of communication content from a user of another electronic device, wherein the user of the another electronic device corresponds to the at least one other party information item, and display the communication log information corresponding to the at least one other party information item to indicate that the number of communication content has been received.

It is contemplated that the controller is further configured to display at least one icon in the second area, such that each of the at least one icon represents a corresponding one of the at least one communication category to which at least one of the number of communication content belongs.

In another aspect of the invention, a mobile terminal includes a display including a first area for displaying at least one other party information item and a second area for displaying communication log information corresponding to the at least one other party information item and a controller. The controller is configured to display at least one communication content corresponding to one of the at least one other party information item when a signal for selecting the one of the at least one other party information item is received, and display at least one communication content belonging to one of at least one communication category of the communication log information when a signal for selecting the communication log information is received.

It is contemplated that the controller is further configured to simultaneously transmit each of the at least one communication content belonging to a corresponding one of the at least one communication category to a user of another electronic device corresponding to one of the at least one other party information item.

It is contemplated that the controller is further configured to select the corresponding one of the at least one communication category according to transmission information received from a user of the mobile terminal.

It is contemplated that the controller is further configured to display at least one icon on the display while the transmission information is received, such that each of the at least one icon represents a corresponding one of the at least one communication category.

In another aspect of the invention, a method of controlling a mobile terminal includes displaying at least one other party information item in a first area of a display, displaying communication log information corresponding to the at least one other party information item in a second area of the display and displaying at least one communication content according to an arrangement standard corresponding to selected information when a signal for selecting the one of the at least one other party information item is received or when a signal for selecting the communication log information is received.

It is contemplated that displaying the at least one communication content includes displaying the at least one communication content corresponding to the selected one of the at least one other party information when the signal for selecting one of the at least one other party information item is received, and displaying the at least one communication content belonging to a communication category of the selected communication log information when the signal for selecting the communication log information is received.

It is contemplated that displaying the at least one other party information item includes arranging the at least one other party information item that corresponds to a user of another electronic device based on a frequency of transmitting or receiving a corresponding one of the at least one communication content to or from the user of the another electronic device.

It is contemplated that the method further includes simultaneously transmitting each of the at least one communication content that belongs to a corresponding one of at least one communication category to a user of another electronic device corresponding to one of the at least one other party information item.

It is contemplated that the method further includes selecting the corresponding one of the at least one communication category according to transmission information received from a user of the mobile terminal.

It is contemplated that the method further includes displaying at least one icon on the display while the transmission information is received, such that each of the at least one icon represents a corresponding one of the at least one communication category.

It is contemplated that the method further includes receiving a number of communication content from a user of another electronic device, wherein the user of the another electronic device corresponds to the at least one other party information item, and displaying the communication log information corresponding to the at least one other party information item to indicate that the number of communication content has been received.

It is contemplated that the method further includes displaying at least one icon in the second area, such that each of the at least one icon represents a corresponding one of the at least one communication category to which at least one of the number of communication content belongs.

It is to be understood that the advantages that can be obtained by the present invention are not limited to the aforementioned advantages and other advantages which are not mentioned will be apparent from the following description to the person with an ordinary skill in the art to which the present invention pertains.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the following drawings, like numerals refer to like elements.

DETAILED DESCRIPTION OF THE INVENTION

This document will now be described more fully with reference to the accompanying drawings, in which exemplary embodiments of this document are shown. This document may, however, be embodied in many different forms and should not be construed as being limited to the embodiments set forth herein; rather, the embodiments are provided so that this disclosure will be thorough and complete, and will fully convey the concept of this document to those skilled in the art.

Hereinafter, a mobile terminal as related to the present invention will be described below in more detail with reference to the accompanying drawings. The terms "module" and "unit" as used herein to describe various components of the mobile terminal are used interchangeably. The mobile terminal described herein can include, for example, a cellular phone, a smart phone, a laptop computer, a digital broadcasting terminal, a personal digital assistant (PDA), a portable multimedia player (PMP), or a navigation system.

Figure 1:
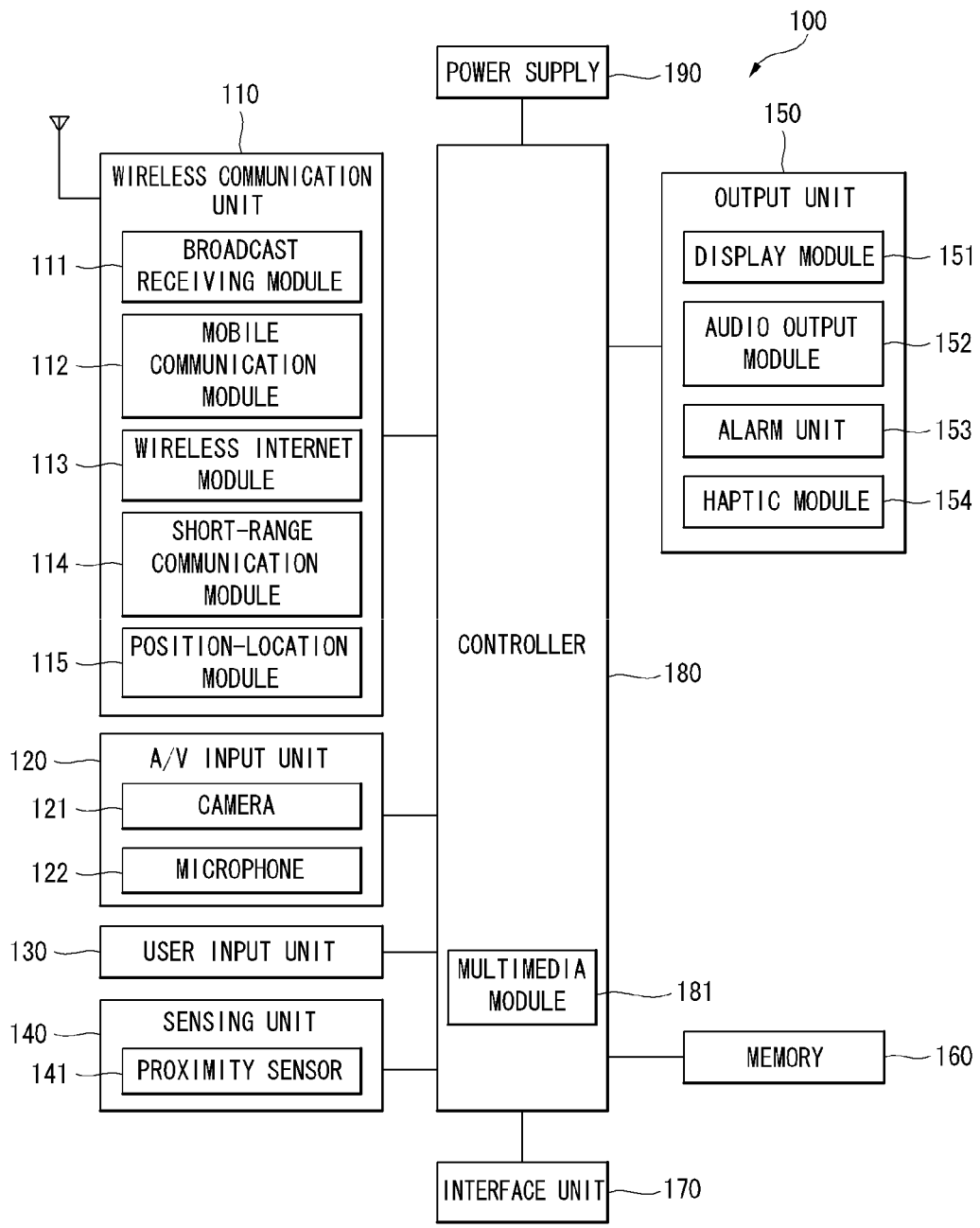
FIG. 1 illustrates an exemplary block diagram of a mobile terminal in accordance with one embodiment of the present invention.

FIG. 1 illustrates an exemplary block diagram of a mobile terminal 100 in accordance with one embodiment of the present invention. It should be understood that embodiments, configurations and arrangements other than that depicted in FIG. 1 can be used without departing from the spirit and scope of the invention. As shown in FIG. 1, the mobile terminal 100 includes a wireless communication unit 110, an audio/video (A/V) input unit 120, a user input unit 130, a sensing unit 140, an output unit 150, a memory 160, an interface unit 170, a controller 180, and a power supply 190. It should be understood that the mobile terminal 100 may include additional or fewer components than those shown in FIG. 1.

For example, the wireless communication unit 110 can include a broadcast receiving module 111, a mobile communication module 112, a wireless Internet module 113, a short-range communication module 114, and a position-location module 115.

The broadcast receiving module 111 receives broadcasting signals and/or broadcasting-related information from an external broadcasting management server via a broadcasting channel. The broadcasting channel can be a satellite channel or a terrestrial channel. The broadcasting management server can be a server that generates and transmits broadcasting signals and/or broadcasting-related information, or a server that receives a previously-generated broadcasting signal and/or previously-generated broadcasting-related information and transmits the previously-generated broadcast signal and/or previously-generated broadcasting-related information to the mobile terminal 100.

For example, the broadcasting signals can be TV broadcasting signals, radio broadcasting signals, data broadcasting signals, or the combination of a TV broadcasting signal and a radio broadcasting signal.

The broadcasting-related information can include broadcasting channel information, broadcasting program information or broadcasting service provider information. The broadcasting-related information can be provided to the mobile terminal 100 through a mobile communication network. In such a case, the broadcasting-related information can be received by the mobile communication module 112.

The broadcasting-related information can take various forms. For example, the broadcasting-related information can have the form of an electronic program guide (EPG) of the digital multimedia broadcasting (DMB) standard, or an electronic service guide (ESG) of the digital video broadcast-handheld (DVB-H) standard.

The broadcast receiving module 111 can be configured to receive broadcasting signals using various types of broadcasting systems, such as digital multimedia broadcasting-terrestrial (DMB-T), digital multimedia broadcasting-satellite (DMB-S), the data broadcasting system known as media forward link only (MediaFLO™), digital video broadcast-handheld (DVB-H), or integrated services digital broadcast-terrestrial (ISDB-T) systems. The broadcast receiving module 111 can be configured to receive signals from broadcasting systems providing broadcasting signals other than the above-described digital broadcasting systems. The broadcasting signals and/or the broadcasting-related information received via the broadcast receiving module 111 can be stored in a storage medium, such as the memory 160.

The mobile communication module 112 can transmit and/or receive radio signals to and/or from at least a base station, an external terminal, or a server in a mobile communication network. Such radio signals can include a voice call signal, a video telephony call signal or data in various forms according to a transmission and reception of text/multimedia messages.

The wireless Internet module 113 can be a module that supports wireless Internet access for the mobile terminal 100. For example, the wireless Internet module 113 can be included in the mobile terminal 100 or installed in an external device. The wireless Internet technology implemented by the wireless Internet module 113 can be a wireless local area network (WLAN), Wi-Fi, Wireless Broadband (WiBro™), World Interoperability for Microwave Access (WiMAX™), or High Speed Downlink Packet Access (HSDPA).

The short-range communication module 114 can be a module for supporting local area communication. For example, the short-range communication module 114 can be configured to communicate using short range communication technology, such as Bluetooth™, radio frequency identification (RFID), Infrared Data Association (IrDA), Ultra-wideband (UWB), or ZigBee™.

The position-location module 115 is a module for confirming or determining the position of the mobile terminal 100. The position-location module 115 can acquire position information using a global navigation satellite system (GNSS). The GNSS is a term used to describe a radio navigation satellite system that revolves around the earth and transmits reference signals to predetermined types of radio navigation receivers, such that the radio navigation receivers can determine their positions on the earth's surface or near the earth's surface. For example, the GNSS can include a global positioning system (GPS) of the United States, Galileo® of Europe, global orbiting navigational satellite system (GLONASS) of Russia, COMPASS of China, or a quasi-zenith satellite system (QZSS) of Japan, among others.

In one embodiment, the position-location module 115 can be a GPS module. The GPS module can calculate the distances between one point or object and at least three satellites, as well as time information that indicates when the distance information is measured. Trigonometric computations can then be applied to the distances to determine three-dimensional position information on the point or object according to a latitude, longitude and altitude at a predetermined time.

A method of calculating position and time information using three satellites and correcting the calculated position and time information using another satellite can also be used. In addition, the GPS module can continuously calculate the current position in real time and calculate velocity information using the position information.

The A/V input unit 120 can be used to input an audio signal or a video signal, and can include a camera 121 and a microphone 122. For example, the camera 121 can process image frames of still images or moving images obtained by an image sensor of the camera 121 in a video telephony mode or a photographing mode. The processed image frames can be displayed on a display module 151, which can be a touch screen display.

The image frames processed by the camera 121 can be stored in the memory 160 or can be transmitted to an external device through the wireless communication unit 110. Other embodiments of the mobile terminal 100 can include more than one camera 121.

The microphone 122 can receive an external audio signal in a call mode, a recording mode or a speech recognition mode, and can process the received audio signal into electrical audio data. The audio data can then be converted into a form that can be transmitted to a mobile communication base station through the mobile communication module 112 and can be output in the call mode. The microphone 122 can apply various noise removal or noise canceling algorithms for removing or reducing noise generated when the external audio signal is received.

The user input unit 130 can receive input data from a user for controlling various operations of the mobile terminal 100. The user input unit 130 can include a keypad, a dome switch, a touch pad that utilizes constant voltage or capacitance, a jog wheel, a jog switch or other input devices.

The sensing unit 140 can sense a position of the mobile terminal 100, whether a user touches the mobile terminal 100, a direction of the mobile terminal 100, acceleration or deceleration of the mobile terminal 100, and a current state of the mobile terminal 100, such as an open or close state.

The sensing unit 140 can generate a sensing signal for controlling the operation of the mobile terminal 100. For example, when the mobile terminal 100 is implemented as a slide type phone, the sensing unit 140 can sense whether the mobile terminal 100 is opened or closed. Further, the sensing unit 140 can sense whether the power supply 190 supplies power and whether the interface unit 170 is connected to an external device. The sensing unit 140 can also include a proximity sensor 141.

The output unit 150 can generate visual, auditory and/or tactile outputs and can include the display module 151, an audio output module 152, an alarm unit 153 and a haptic module 154. The display module 151 can display information processed by the mobile terminal 100. For example, when the mobile terminal 100 is in a call mode, the display module 151 can display a user interface (UI) or a graphic user interface (GUI) for making or receiving a call. For example, when the mobile terminal 100 is in the video telephony mode or the photographing mode, the display module 151 can display a captured and/or received image, a UI or a GUI.

In addition, the display module 151 can include at least a liquid crystal display, a thin film transistor liquid crystal display, an organic light-emitting diode display, a flexible display or a three-dimensional display. In one embodiment, the display used in the display module 151 can be of a transparent type or a light transmissive type, such that the display module 151 is implemented as a transparent display. For example, the transparent display can include a transparent liquid crystal display. The rear structure of the display module 151 can also be of a light transmissive type. Accordingly, a user may see an object located behind the body of the mobile terminal 100 through the transparent area of the body of the mobile terminal 100 that is occupied by the display module 151.

The mobile terminal 100 can also include more than one display module 151. For example, the mobile terminal 100 can include a number of display modules 151 that are arranged on a single face of the mobile terminal 100 at a predetermined distance or integrated displays. The number of display modules 151 can also be arranged on different sides of the mobile terminal 100.

When the display module 151 and a sensor for sensing a user touch (hereinafter referred to as a "touch sensor") are configured as a layered structure to form a touch screen, the display module 151 can be used as an input device in addition to an output device. For example, the touch sensor can be in the form of a touch film, a touch sheet, or a touch pad.

The touch sensor can convert a variation in pressure applied to a specific portion of the display module 151 or a variation in capacitance generated at a specific portion of the display module 151 into an electric input signal. The touch sensor can sense pressure resulting from a touch, as well as the position and area of the touch.

When the user applies a touch input to the touch sensor, a signal corresponding to the touch input can be transmitted to a touch controller (not shown). The touch controller can process the signal and transmit data corresponding to the processed signal to the controller 180. The controller 180 can then use the data to detect a touched portion of the display module 151.

The proximity sensor 141 of the sensing unit 140 can be located in an internal region of the mobile terminal 100, surrounded by the touch screen, or near the touch screen. The proximity sensor 141 can sense an object approaching a predetermined sensing face or an object located near the proximity sensor 141 without any physical contact using an electromagnetic force or infrared rays. The longevity of the proximity sensor 141 can substantially exceed the longevity of a contact sensor and, therefore, can have wide applications in the mobile terminal 100.

The proximity sensor 141 can include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen can be implemented in one embodiment of the mobile terminal 100, such that a proximity of a pointer can be detected through a variation in an electric field according to the proximity of the pointer. Accordingly, the touch screen (touch sensor) can be classified as the proximity sensor 141.

For purposes of clarity, an action of the pointer approaching the touch screen without actually contacting the touch screen will be herein referred to as a "proximity touch," while an action of bringing the pointer into contact with the touch screen will be herein referred to as a "contact touch." A proximity touch point of the pointer on the touch screen can correspond to a point on the touch screen from which the pointer is situated perpendicularly with respect to the touch screen.

Via the proximity sensor 141, a proximity touch and a proximity touch pattern, such as a proximity touch distance, a proximity touch direction, a proximity touch velocity, a proximity touch time, a proximity touch position, or a proximity touch movement state can be detected. For example, information corresponding to the detected proximity touch action and proximity touch pattern can be displayed on the touch screen.

The audio output module 152 can output audio data received from the wireless communication unit 110, or stored in the memory 160, in a call signal receiving mode, a telephone call mode, a recording mode, a speech recognition mode, or a broadcasting receiving mode. The audio output module 152 can also provide audio signals related to particular functions performed by the mobile terminal 100, such as a call signal incoming tone or a message incoming tone. For example, the audio output module 152 can include a receiver, a speaker, or a buzzer. The audio output module 152 can output sounds through an earphone jack (not shown), which can be heard by a user by connecting an earphone to the earphone jack.

The alarm unit 153 can output a signal for indicating the occurrence of an event of the mobile terminal 100. For example, alarms can be generated when receiving a call signal or message, a key input signal, or a touch input. In addition to video signals or audio signals, the alarm unit 153 can provide outputs in a different manner to indicate the occurrence of an event, such as a signal for indicating the occurrence of an event through vibration. The video signals or the audio signals can also be output through the display module 151 or the audio output module 152.

The haptic module 154 can generate various haptic effects that can be physically sensed by the user. For example, a haptic effect generated by the haptic module 154 can include a vibration. The intensity and/or pattern of the vibration generated by the haptic module 154 can be controlled. For example, different vibrations can be combined and provided or sequentially provided.

The haptic module 154 can generate a variety of haptic effects including a stimulation caused by an arrangement of vertically moving pins that are in contact with the skin of the user, and in particular with the face of the user; a stimulation caused by a jet force through a jet hole or a suction of air through a suction hole; a stimulation caused by rubbing of the user's skin; a stimulation caused by contact with an electrode; a stimulation caused by an electrostatic force; and a stimulation caused by the application of cold and warm temperatures using an element capable of absorbing or radiating heat in addition to vibrations.

The haptic module 154 can not only transmit haptic effects through direct contact, but also allow the user to feel haptic effects via kinesthetic sense of the user's fingers or arms. For example, the mobile terminal 100 can include at least two haptic modules 154.

The memory 160 can store software programs for operation of the controller 180, and can store input/output data, such as a phone book, messages, still images, and/or moving images. The memory 160 can further store data related to various patterns of vibrations and audio signals for output when a touch input is applied to the touch screen 151.

For example, the memory 160 can include at least one type of storage medium, such as a flash memory, a hard disk type memory, a multimedia card micro type memory, a card type memory, such as a Secure Digital (SD) card or Extreme Digital (xD) card, a random access memory (RAM), a static random access memory (SRAM), a read-only memory (ROM), a programmable ROM (PROM), an electrically erasable programmable read-only memory (EEPROM), a magnetic memory, a magnetic disk, or an optical disk. In other embodiments, the memory 160 can be a storage device that can be accessed by the mobile terminal 100 via the Internet.

The interface unit 170 in FIG. 1 can include, for example, a wired or wireless headset port, an external charger port, a wired or wireless data port, a memory card port, a port for connecting a device having a user identification module, an audio input/output (I/O) port, a video I/O port, and/or an earphone port.

The interface unit 170 can serve as a path to external devices connected to the mobile terminal 100. The interface unit 170 can receive data from the external devices or power, and transmit the data or power to internal components of the mobile terminal 100. In addition, the interface unit 170 can transmit data of the mobile terminal 100 to the external devices.

The interface unit 170 can also interface with a user identification module, such as a chip that stores information for authenticating authority to use the mobile terminal 100. For example, the user identification module can be a user identify module (UIM), a subscriber identify module (SIM) or a universal subscriber identify module (USIM). An identification device including the user identification module can also be manufactured in the form of a smart card. Accordingly, the identification device can be connected to the mobile terminal 100 through a port of the interface unit 170.

In addition, when the mobile terminal 100 is connected with an external cradle, the interface unit 170 can serve as a conduit to allow power from the cradle to be supplied to the mobile terminal 100, or can serve as a conduit to allow various command signals input by the user via the external cradle to be transmitted to the mobile terminal 100. Various command signals or power provided by the external cradle can be used as signals for confirming whether the mobile terminal 100 is properly set on the external cradle.

The controller 180 can control the general operations of the mobile terminal 100. For example, the controller 180 can be a microprocessor configured to perform control and processing associated with voice communication, data communication, and/or video telephony. The controller 180 can include a multimedia module 181 for playing multimedia. The multimedia module 181 can be integrated into the controller 180 as shown in FIG. 1, or can be external to the controller 180. The controller 180 can perform a pattern recognition processing to recognize a character or image from a handwriting input or a picture-drawing input performed on the touch screen.

In one embodiment, the mobile terminal 100 can include a first touch screen configured to display a first object, a second touch screen configured to display a second object. The controller 180 can be configured to receive a first touch input applied to the first object and to link the first object to a function corresponding to the second object when receiving a second touch input applied to the second object while the first touch input is maintained. Moreover, the mobile terminal 100 can be configured to apply a method including displaying a first object on the first touch screen, displaying a second object on the second touch screen, receiving a first touch input applied to the first object, and linking the first object to a function corresponding to the second object when a second touch input applied to the second object is received while the first touch input is maintained.

The power supply 190 can receive external power or internal power, and provide power required for operating the components of the mobile terminal 100 under the control of the controller 180.

For example, the components of the mobile terminal 100 described herein can be implemented in hardware using at least application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electronic units designed to perform the functions described herein. In other embodiments, such components can be implemented by the controller 180.

For example, the procedures or functions described herein can be implemented in software using separate software modules that allow performance of at least one function or operation. Software codes can be implemented by a software application or program written in any suitable programming language. The software codes can be stored in the memory 160 and executed by the controller 180.

Figure 2A:
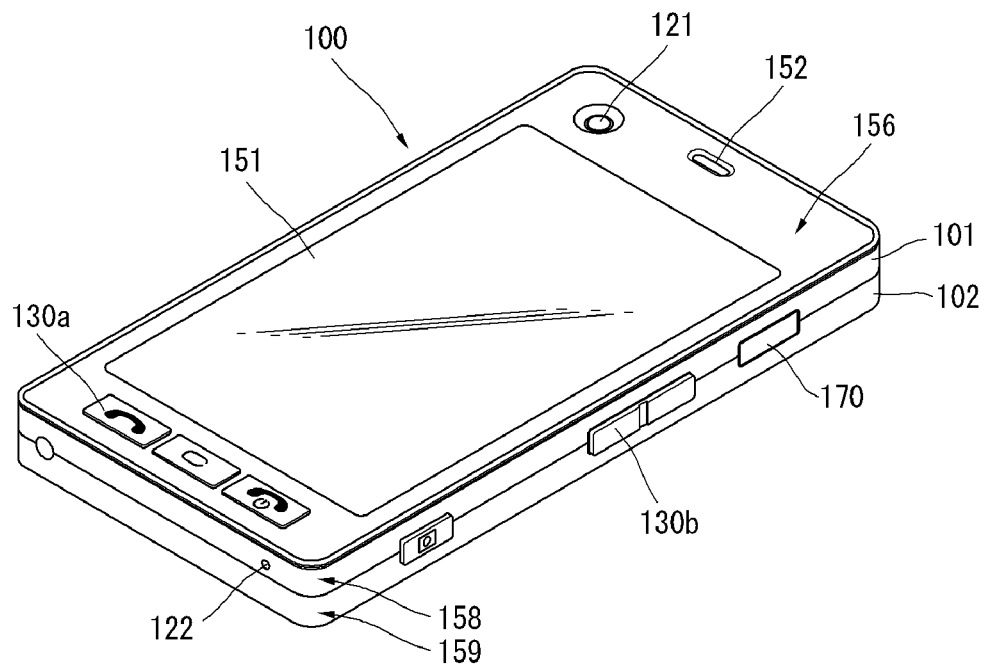
FIG. 2A is a front perspective view of the mobile terminal in accordance with one embodiment of the present invention.

FIG. 2A is a front perspective view of the mobile terminal 100 in accordance with one embodiment of the present invention. In FIG. 2A, the mobile terminal 100 is shown to have a bar type terminal body. However, it should be understood that the mobile terminal 100 is not limited to a bar type terminal body and can have various other body types that include a combination of two bodies that are configured to move relative to one another, such as a slide type body, folder type body, swing type body, and a swivel type body.

The case of the mobile terminal 100, otherwise referred to as a "casing," "housing," or "cover," forming the exterior of the mobile terminal 100, can include a front case 101 and a rear case 102. Various electronic components are installed in the space between the front case 101 and the rear case 102. One or more intermediate cases can be additionally disposed between the front case 101 and the rear case 102.

For example, the front case 101 and the rear case 102 can be made by plastic injection-molding or can be made of a metallic material, such as stainless steel (STS) or titanium (Ti).

The display module 151, the audio output module 152, the camera 121, the first user input unit 130a, the second user input unit 130b, the microphone 122, or the interface unit 170 can be situated on the mobile terminal 100, and specifically, on the front case 101.

As shown in FIG. 2A, for example, the display module 151 can be configured to occupy a substantial portion of the front face 156 of the front case 101. As also shown in FIG. 2A, the audio output module 152 and the camera 121 can be arranged in proximity to one end of the display module 151, and the first user input unit 130a and the microphone 122 can be located in proximity to another end of the display module 151. As further shown in FIG. 2A, the second user input unit 130b and the interface unit 170 are arranged on the sides of the front case 101 and the rear case 102, such as sides 158 and 159, respectively.

The user input unit 130 described above with respect to FIG. 1 can be configured to receive commands for controlling the operation of the mobile terminal 100 and can include one or more user inputs, such as the first user input 130a and the second user input 130b shown in FIG. 2A. The first user input unit 130a and the second user input unit 130b can each be referred to as a "manipulation unit" and can be configured to employ various methods and techniques of tactile manipulation and response to facilitate operation by the user.

The first user input unit 130a and the second user input unit 130b can be configured to receive various inputs. For example, the first user input unit 130a can be configured to receive a start command, an end command, and a scroll command, and the second user input unit 130b can be configured to receive a volume control command for controlling the sound output from the audio output module 152, or a command for changing the mode of the display module 151 to a touch recognition mode.

Figure 2B:
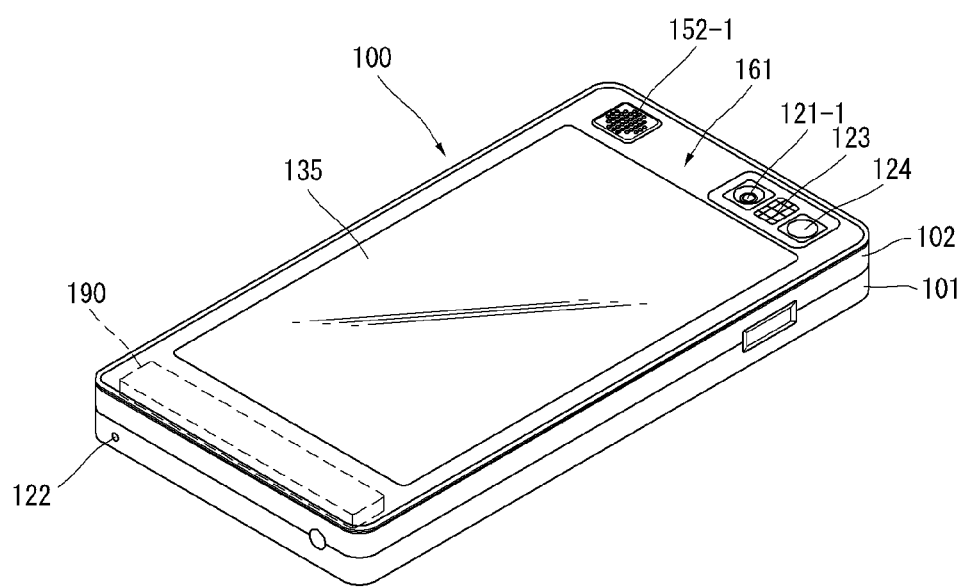
FIG. 2B is a rear perspective view of the mobile terminal in accordance with one embodiment of the present invention.

FIG. 2B is a rear perspective view of the mobile terminal 100 in accordance with one embodiment of the present invention. As shown in FIG. 2B, a camera 121-1 can be additionally located on a rear surface 161 of the rear case 102. The camera 121-1 has a direction of view that is substantially opposite to the direction of view of the camera 121 shown in FIG. 2A. The cameras 121 and 121-1 can have different resolutions, that is, different pixels counts, with respect to one another.

For example, the camera 121 can operate with a relatively lower resolution than the camera 121-1 in order to capture an image of the user to allow immediate transmission of the image to another user in real-time for video telephony, whereas the camera 121-1 can operate with a relatively higher resolution than the camera 121 to capture images of general objects with high picture quality, which may not require immediate transmission in real-time, but may be stored for later viewing or use. For example, the cameras 121 and the camera 121-1 can be configured to rotate or to pop-up on the mobile terminal 100.

Additional camera related components, such as a flash 123 and a mirror 124, can be located adjacent to the camera 121-1. When an image of a subject is captured with the camera 121-1, the flash 123 illuminates the subject. The mirror 124 allows self-image capturing by allowing the user to see himself when the user desires to capture his own image using the camera 121-1.

The rear surface 161 of the rear case 102 can further include a second audio output module 152-1. The second audio output module 152-1 can support a stereo sound function in conjunction with the first audio output module 152 shown in FIG. 2A and can be used for communication during a phone call when the mobile terminal 100 is in a speaker phone mode.

A broadcasting signal receiving antenna (not shown) can be additionally attached to the side of the body of the mobile terminal 100 in addition to an antenna used for telephone calls. The broadcasting signal receiving antenna can form a part of the broadcast receiving module 111 shown in FIG. 1, and can be set in the body of the mobile terminal 100 such that the broadcasting signal receiving antenna can be pulled out of the body of the mobile terminal 100.

FIG. 2B shows the power supply 190 for providing power to the mobile terminal 100. For example, the power supply 190 can be situated either inside the mobile terminal 100 or detachably coupled to the mobile terminal 100.

As shown in FIG. 2B, a touch pad 135 for sensing a touch by the user can be located on the rear surface 161 of the rear case 102. In one embodiment, the touch pad 135 and the display module 151 can be translucent. In such an embodiment, the information displayed on display module 151 can be output on both sides of the display module 151 and can be viewed through the touch pad 135. The information displayed on the display module 151, which can be viewed through both sides of the display module 151, can be controlled by the touch pad 135. In another embodiment, a second display unit in addition to display module 151 illustrated in FIG. 2A can be located on the rear surface 161 of the rear case 102 and combined with the touch pad 135 to form a touch screen on the rear case 102.

The touch pad 135 operates in connection with the display module 151 of the front case 101. The touch pad 135 can be located in parallel with the display module 151 behind the display unit 151. The touch pad 135 can have a same or smaller size than the display module 151.

Figure 2C:
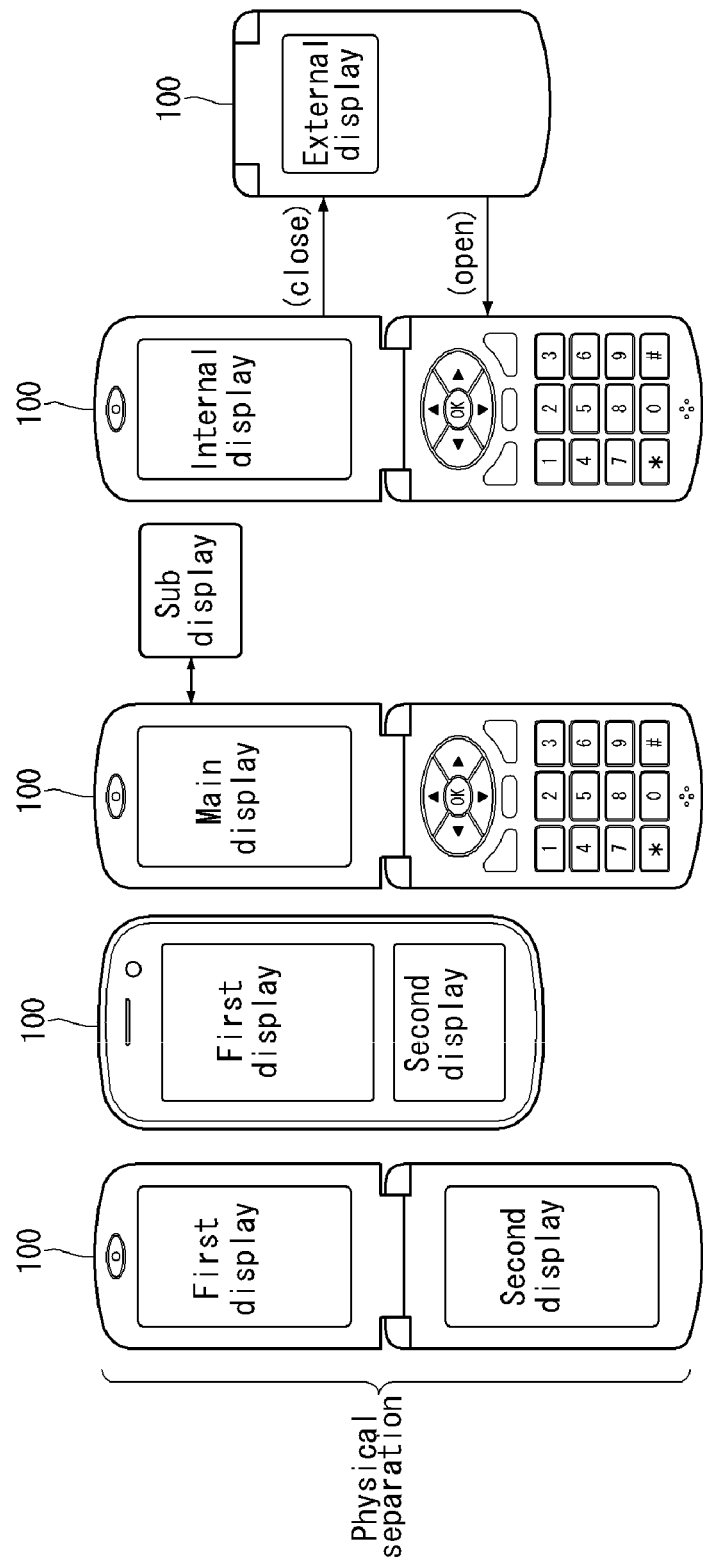
FIGS. 2C and 2D illustrate the mobile terminal and the display unit in accordance with various embodiments of the present invention.
Figure 2D:
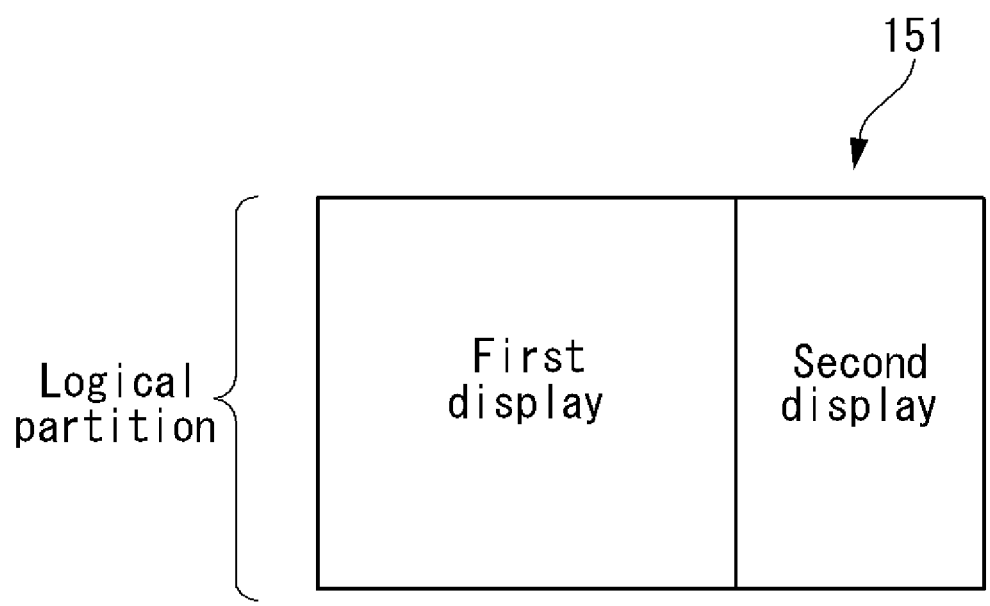

FIGS. 2C and 2D illustrate the mobile terminal 100 and the display module 151 in accordance with various embodiments of the present invention.

Referring to FIG. 2C, the display unit 151 described above with respect to FIG. 1 can include a first display and a second display, which can be physically separated from each other. In a folder type or slide type mobile terminal having two bodies connected through a hinge or slide, the first display (or main display) can be formed on the inner face or outer face of one of the bodies and the second display (or sub display) can be formed on the inner face or outer face of the other body. The sub display can be separated from the mobile terminal 100 and detachably combined with the mobile terminal body through an interface to display data from the mobile terminal 100.

Referring to FIG. 2D, the display module 151 can include first and second displays which are logically separated from one another.

Figure 3:
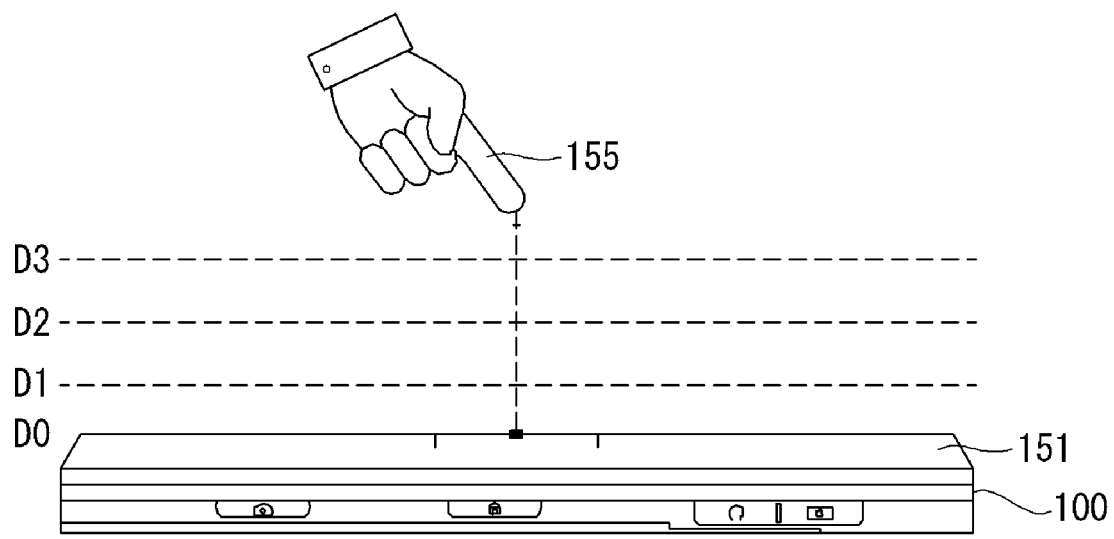
FIG. 3 is a conceptual diagram illustrating the proximity depth of a proximity sensor that may be used for the mobile terminal according to the embodiment of the present invention

The proximity sensor 141 will now be described in greater detail with reference to FIG. 3. FIG. 3 is a conceptual diagram illustrating the proximity depth of a proximity sensor that may be used for the mobile terminal according to the embodiment of the present invention As shown in FIG. 3, when a pointer 155, such as a user's finger or stylus, approaches the touch screen, that is, the display module 151, the proximity sensor 141 located inside or near the touch screen senses the approach of the pointer 155 and outputs a proximity signal. For example, the proximity sensor 141 can be configured to output a proximity signal indicating the distance between the pointer 155 and the touch screen 151. Such a distance is also referred to in the art as a "proximity depth."

The distance at which the proximity signal is provided by the proximity sensor 141 when the pointer 155 approaches the touch screen 151 is referred to as a detection distance. For example, the proximity depth can be determined by using a number of proximity sensors, such as proximity sensor 141, having various detection distances and by comparing the proximity signals provided by each corresponding proximity sensor.

The exemplary mobile terminal 100 shown in FIG. 3 is configured to detect three proximity depths, such as proximity depths D1, D2, and D3, where each proximity depth represents the distance from the touch screen to a location above the touch screen in a substantially perpendicular direction above the touch screen. The relationships between the proximity depths D0, D1, D2, and D3 can be expressed as: D0<D1<D2<D3. It should be understood that in other embodiments, the mobile terminal 100 can be configured to include less than or greater than three proximity sensors to enable detection of any number of proximity depths.

For example, when a contact touch is performed, that is, when the pointer 155 comes into contact with the touch screen 151, the proximity depth D0 is detected and it is recognized as a contact touch; when the pointer 155 is located within the proximity depth D1 and the proximity depth D0, a proximity touch at the proximity depth D1 is recognized; when the pointer 155 is located between the proximity depth D1 and the proximity depth D2, a proximity touch at the proximity depth D2 is recognized; when the pointer 155 is located within the proximity depth D2 and the proximity depth D3, a proximity touch at the proximity depth D3 is recognized; when the pointer 155 is located at a distance greater than the proximity depth D3, no proximity touch is recognized.

Accordingly, the controller 180 can recognize the proximity touch as proximity input signals according to the proximity distance and proximity position of the pointer 155 with respect to the touch screen and can perform various operations and controls according to the input proximity input signals.

Figure 4:
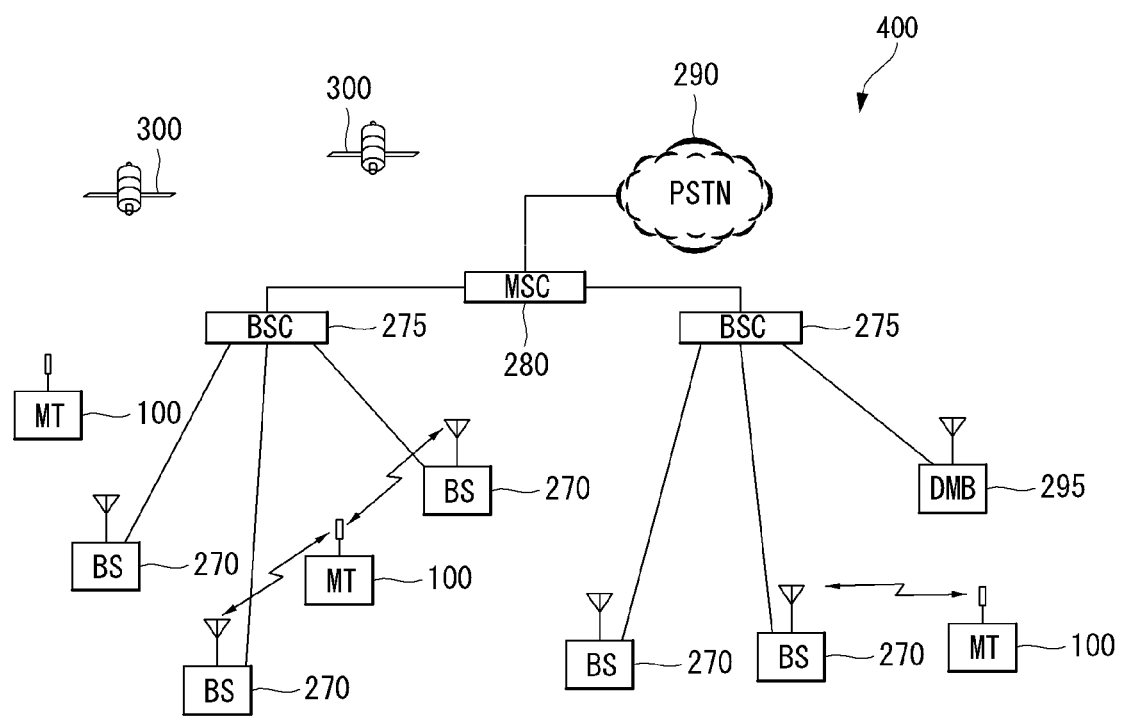
FIG. 4 illustrates a code division multiple access (CDMA) wireless communication system.

FIG. 4 illustrates a code division multiple access (CDMA) wireless communication system 400 that includes mobile terminals (MTs) 100, base stations (BSs) 270, base station controllers (BSCs) 275, and a mobile switching center (MSC) 280. The MSC 280 is connected to a public switched telephone network (PSTN) 290. The MSC 280 is connected to the BSCs 275. The BSCs 275 are connected to the BSs 270 through backhaul lines. The backhaul lines can be constructed according to E1/T1, Asynchronous Transfer Mode (ATM), Internet Protocol (IP), Point-to-Point Protocol (PPP), frame relay, or an x Digital Subscriber Line (xDSL) that is well-known in the art, such as a High bit rate Digital Subscriber Line (HDSL) or an Asymmetric Digital Subscriber Line (ADSL). The CDMA wireless communication system 400 can include at least two BSCs 275.

Each of the BSs 270 can include one or more sectors, and each sector can include an omnidirectional antenna or an antenna adjusted to a specific radiation direction of a corresponding BS 270. Otherwise, each sector can include two diversity reception antennas. Each of the BSs 270 is constructed to have frequency assignments, and the frequency assignments can have specific spectra, such as 1.25 MHz and 5 MHz. Intersection of sectors and frequency assignments can be referred to as a CDMA channel.

The BSs 270 can be referred to as base station transceiver subsystems (BTSs). Furthermore, the term "base station" can be used to collectively designate the BSC 275 and one or more BSs 270 in several examples. In one embodiment, the BSs 270 can be referred to as "cell sites." In another embodiment, individual sectors of a specific BS 270 can be referred to as cell sites.

A terrestrial DMB transmitter 295 can transmit broadcasting signals to the MTs 100 operating in the CDMA wireless communication system 400. The broadcast receiving module 111 of each of the MTs 100 is configured to receive the broadcasting signals transmitted from the DMB transmitter 295. This can be similarly applied to different types of broadcast and multicast signaling as previously described.

FIG. 4 illustrates GPS satellites 300. The GPS satellites 300 can track the positions of some or all of the MTs 100. Although two GPS satellites 300 are shown in FIG. 4, position information can be obtained from less than or more than two GPS satellites 300. Furthermore, other position-tracking techniques can be used, such as position-tracking techniques that can be used in place of GPS techniques or position-tracking techniques that can be used in addition to the GPS techniques. If required, some or all of the GPS satellites 300 can separately or additionally support satellite DMB transmission.

During operation of the CDMA wireless communication system 400, the BSs 270 receive reverse link signals from the MTs 100. The MTs 100 can be in various states of operation, such as making a call, sending a message or performing other communications. The reverse link signals are received and processed by the BSs 270. The processed data is transmitted to the BSCs 275 connected to the BSs 270.

The BSCs 275 provide call resource allocation and mobility management functionality including soft handoffs between the BSs 270. Furthermore, the BSCs 275 transmit the received data to the MSC 280. The BSCs 275 control the BSs 270 to transmit forward link signals to the MTs 100.

The MSC 280 provides additional routing services for interfacing with the PSTN 290. The PSTN 290 interfaces with the MSC 280, and the MSC 280 interfaces with the BSCs 275.

Figure 5A:
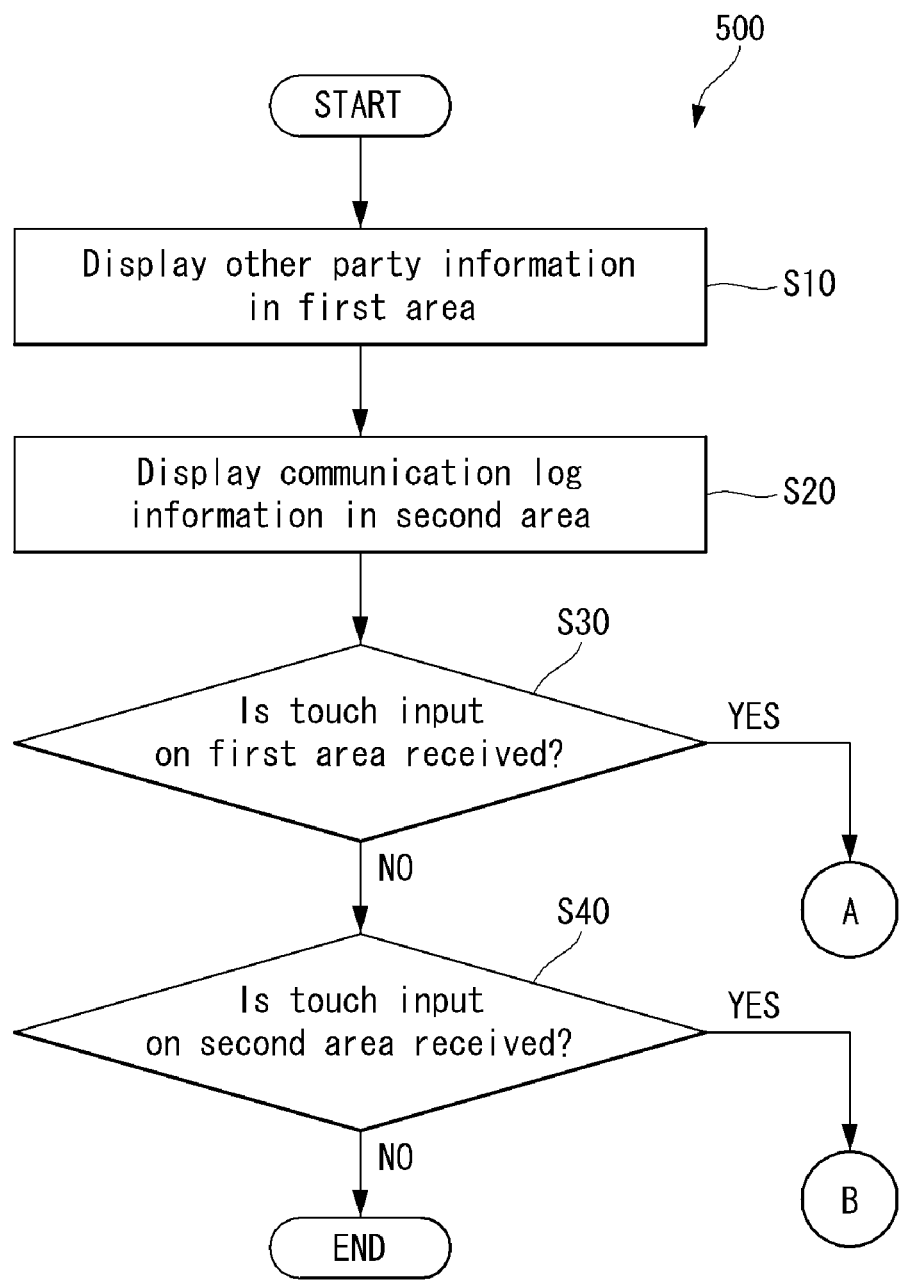
FIGS. 5A-5C show a flowchart of a method for controlling the mobile terminal in accordance with one embodiment of the present invention.
Figure 5B:
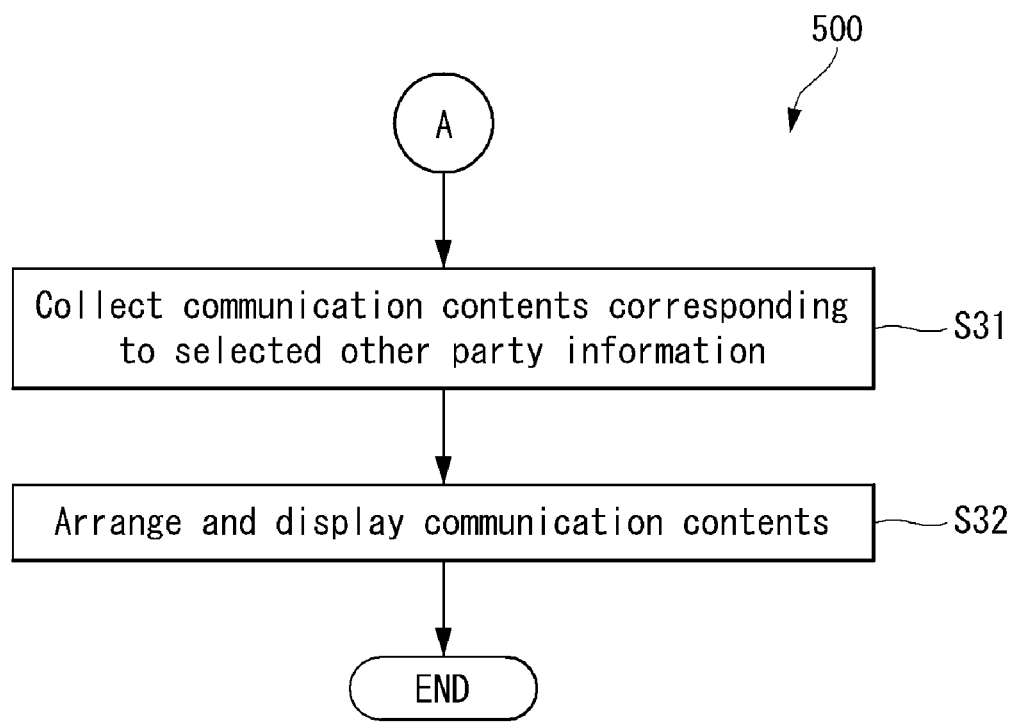
Figure 5C:
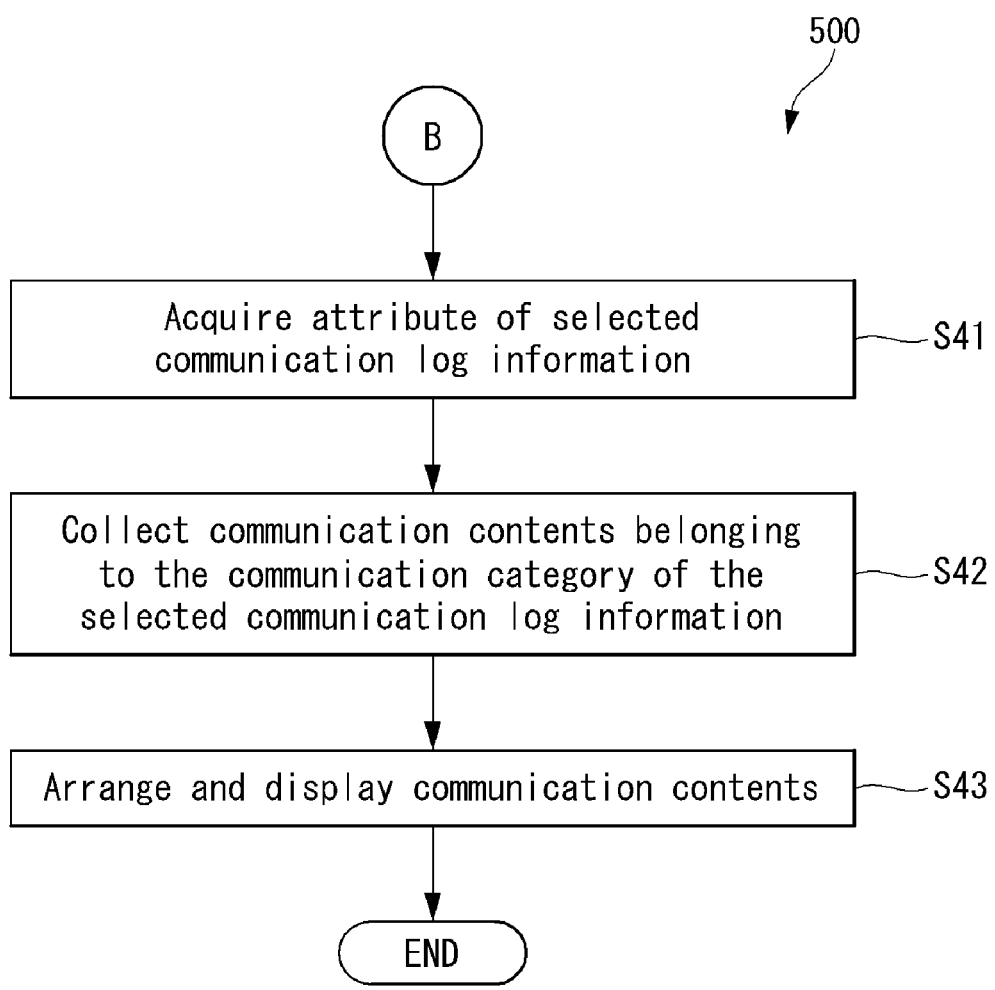

FIGS. 5A-5C show a flowchart 500 of a method for controlling the mobile terminal 100 shown in FIG. 1 in accordance with one embodiment of the present invention. In the embodiment shown in FIGS. 5A-5C, the controller 180 of the mobile terminal 100 can display information based on an area touched by the user on the display module 151.

With reference to FIG. 5A, the mobile terminal 100 displays other party information in a first area on the display module 151 (S10). The mobile terminal 100 further displays communication log information in a second area on the display module 151 (S20). The controller 180 determines whether a touch input on the first area is received when the other party information is displayed in the first area and the communication log information is displayed in the second area (S30). If a touch input on the first area is received (S30), then a function corresponding to the received touch input can be executed as explained with reference to FIG. 5B. However, if a touch input on the first area is not received (S30), the controller 180 determines whether a touch input on the second area is received (S40). If a touch input on the second area is received (S40), then a function corresponding to the received touch input can be executed as explained with reference to FIG. 5C.

With reference to FIG. 5B, when a touch input on the first area on the display module 151 is received (S30), the controller 180 collects communication contents corresponding to the selected other party information (S31). Upon collecting the communication contents with respect to the selected other party, the controller 180 arranges and displays the collected communication contents on the display module 151 (S32).

With reference to FIG. 5C, when a touch input on the second area on the display module 151 is received (S40), the controller 180 acquires the attribute of the selected communication log information (S41). Upon acquiring the attribute of the communication log information, the controller 180 collects communication contents belonging to the communication category of the selected communication log information (S42). When the communication contents are collected, the controller 180 arranges and displays the collected communication contents on the display module 151 (S43).

Figure 6A:
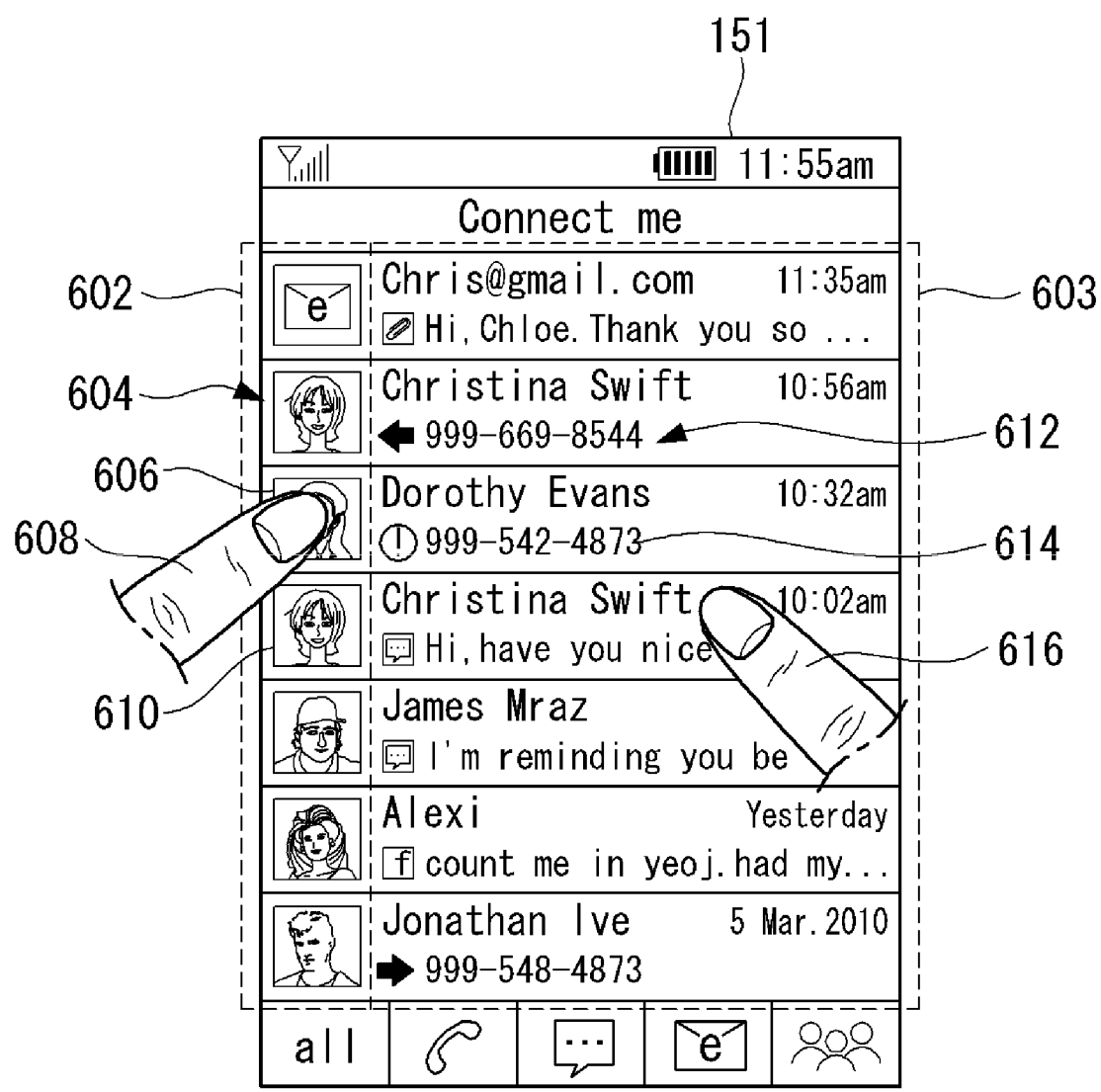
FIGS. 6A-6C are exemplary display screens of the display module showing the operation of the mobile terminal in accordance with the method of FIGS. 5A-5C.
Figure 6B:
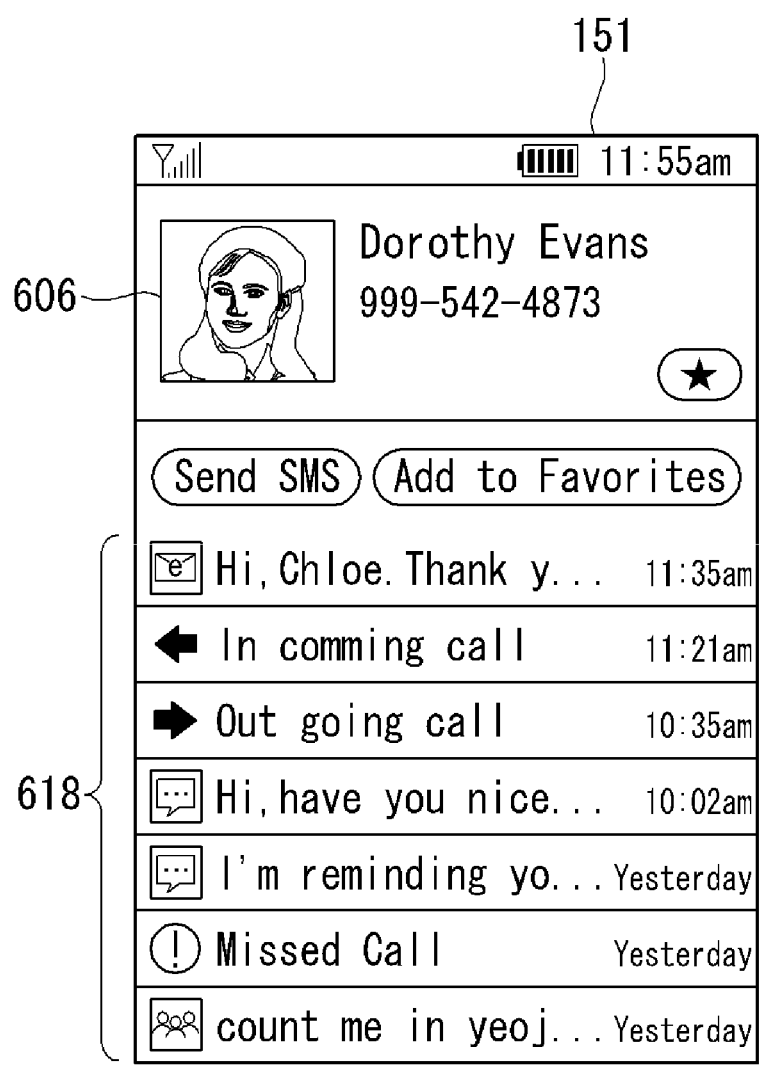
Figure 6C:
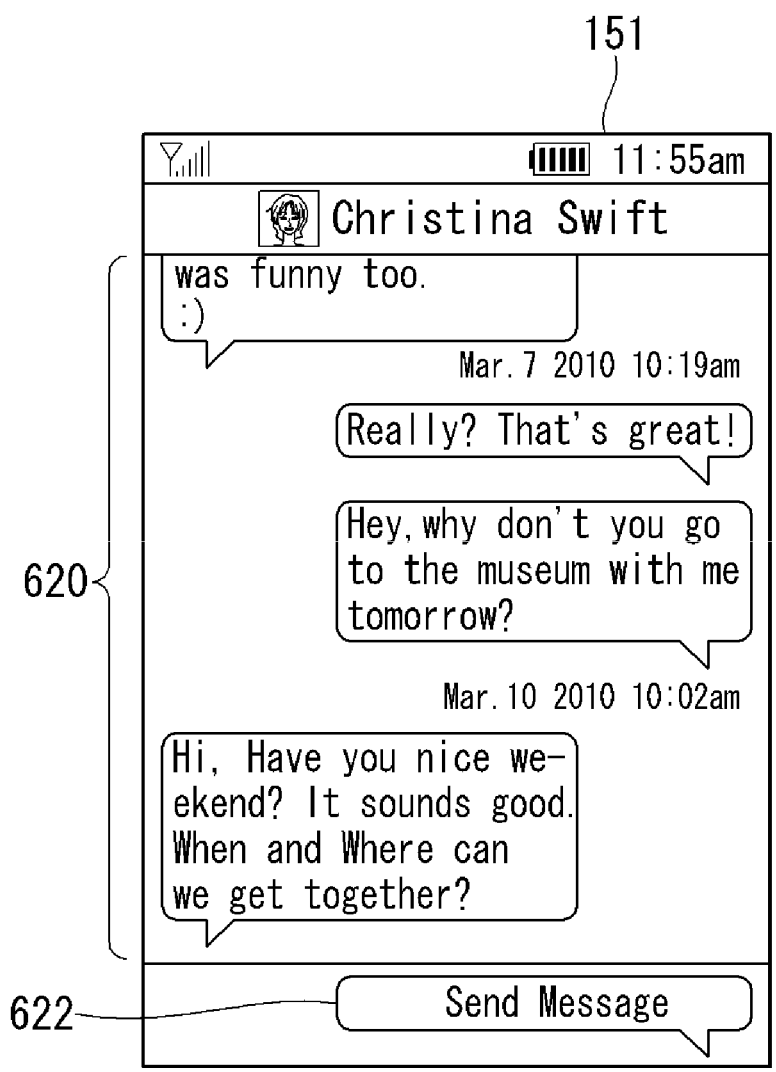

The method described above with respect to FIGS. 5A-5C will now be described in further detail with respect to FIGS. 6A-6C. FIGS. 6A-6C are exemplary display screens of the display module 151 showing the operation of the mobile terminal 100 in accordance with the method of FIGS. 5A-5C.

The first and second areas 602 and 603 shown in FIG. 6A can be specific regions on the display module 151. More specifically, the first and second areas 602 and 603 can correspond to the whole or parts of the display module 151.

As shown in FIG. 6A, the display module 151 can be divided into the first area 602 and the second area 603. The mobile terminal 100 can display other party information 604 in the first area 602, and communication log information 612 corresponding to a list of communications with the corresponding other party in the second area 603. When there is no other party information 604 to be displayed, an image that represents the communication category of contents received from the other party can be displayed in place of the other party information 604.

As shown in FIG. 6A, the user can select one of the other party information items displayed in the first area 602, such as the first other party information 606, using a first pointer, such as the first finger 608. The other party information 604 can be information about a user of another electronic device.

In one embodiment, the other party information 604 can correspond to identification information displayed in the first area 602 on the display module 151 to distinguish a user of a specific electronic device from a user of another electronic device. For example, the other party information 604 can be information regarding a user of another mobile terminal or information regarding a social network service (SNS) user.

The mobile terminal 100 can acquire the other party information 604 using various techniques. For example, the mobile terminal 100 can directly obtain the other party information 604 from the other party's electronic device, such as a terminal. In such a case, the mobile terminal 100 can request the other party's terminal to provide the other party information 604 to the mobile terminal 100 through an operation of the user of the mobile terminal 100 or a control operation of the controller 180.

As another example, the other party information 604 can be acquired from a server. Specifically, the mobile terminal 100 can request the server to provide the other party information 604 to the mobile terminal 100 through an operation of the user of the mobile terminal 100 or a control operation of the controller 180.

As another example, the other party information 604 can be indirectly obtained from a terminal of a third party. For example, when other party information 604 regarding a first user is required, the other party information 604 can be acquired from a second user's terminal that has the other party information 604. Furthermore, the other party information 604 can be stored in the memory 160 of the mobile terminal 100 in an unprocessed form.

For example, the other party information 604 can be stored in the form of a still picture captured by the user of the mobile terminal 100. The controller 180 can then process the still picture, such that the other party information 604 can be displayed on the display module 151.

The other party information 604 can be displayed in various forms, such as a picture, video, caricature, name, or nickname of the other party. In one embodiment, the other party information 604 can be displayed using a combination of the various forms described above.

With further reference to FIG. 6A, the communication log information 612 is information displayed in the second area 603 on the display module 151 and corresponds to the other party information 604 displayed in the first area 602.

As shown in FIG. 6A, the user can select one of the communication log information items displayed in the second area 603, such as the communication log information 614, using a second pointer, such as the second finger 616.

The communication log information 612 can be a communication list corresponding to the other party information 604. For example, the communication log information 612 can correspond to calls, messages and information representing whether messages are uploaded to an SNS with respect to a specific other party. For example, the communication log information 612 can include an icon representing communication means, the whole or part of communication contents, or visual information of communication.

Communication log information 612 that belongs to the same communication category can be selectively displayed on the display module 151. Furthermore, communication log information 612 that corresponds to a specific other party can be grouped and displayed according to a preference of a user or a control operation of the controller 180.

The controller 180 of the mobile terminal 100 executes a function based on whether the user selects the other party information 604 displayed in the first area 602 or the communication log information 612 displayed in the second area 603. That is, communication contents exchanged between the user of the mobile terminal 100 and the other party can be displayed when the other party information 604 displayed in the first area 602 is selected. Alternatively, communication contents belonging to the communication category of the communication log information 612 can be displayed when the communication log information 612 displayed in the second area 603 is selected.

The mobile terminal 100 can display information according to an area of the display module 151 touched by the user. Therefore, user convenience can be improved by avoiding the need for an additional selection operation for arranging the displayed information.

Furthermore, information regarding the other party can be displayed when an image of the other party displayed in the first area 602 is selected, and information regarding the communication category of the communication log information 612 can be displayed when the communication log information 612 displayed in the second area 603 is selected.

As such, intuitive selection and display of information can be achieved. The operation of the mobile terminal 100 when the other party information 604 displayed in the first area 602 is selected and the operation of the mobile terminal 100 when the communication log information 612 displayed in the second area 603 is selected will be explained in more detail with reference to FIGS. 6B and 6C.

Referring to FIGS. 6A and 6B, for example, when the user selects the first other party information 606 shown in FIG. 6A that identifies the other party, such as "Dorothy Evans," the corresponding first communication contents 618 regarding Dorothy Evans can be displayed on the display module 151 as shown in FIG. 6B. The first communication contents 618 can include the contents of communications with Dorothy Evans.

For example, calls and messages transmitted/received to/from Dorothy Evans and contents uploaded to the SNS with respect to Dorothy Evens can be displayed as the first communication contents 618. The user can select one of the displayed first communication contents 618 and confirm the details of the selected communication contents.

Therefore, the communication contents can include the details of the communications with another party. For example, the communication contents can be the contents communicated with the other party corresponding to the other party information 604 in FIG. 6A. For example, the communication contents can be the contents of a message received from the other party. Moreover, when a message is received from a specific other party, the specific other party can be represented by the other party information 604, the communication log information 612 can display the fact that the message is received from the specific other party, and the contents of the message can be included in the communication contents.

The communication contents can be stored in the memory 160 of the mobile terminal 100. In some cases, however, contents communicated with a specific person may not be grouped together in the same location. For example, a call history can be stored in a first region of the memory 160, text messages may be stored in a second region of the memory 160 and SNS contents may be stored in a third region of the memory 160. Furthermore, communication contents may be stored in an external device, such as an external server.

Therefore, the controller 180 can collect the communication contents in cases where the communication contents are dispersed as previously described. When the communication contents have already been collected, the operation of collecting the dispersed communication contents can be omitted.

In one embodiment, the controller 180 can arrange the communication contents based on a predetermined standard and display the arranged communication contents on the display module 151. For example, the controller 180 can display the communication contents in chronological order, such that older communication contents received by the controller 180 are displayed at the bottom of the display module 151 and more recent communication contents received by the controller 180 are displayed at the top of the display module 151.

As another example, the controller 180 can display the communication contents in order of frequency. More specifically, the controller 180 can display communication contents corresponding to a person who frequently communicates with the user of the mobile terminal 100 at the top of the display module 151 and can display communication contents corresponding to a person who does not frequently communicate with the user of the mobile terminal 100 at the bottom of the display module 151.

The communication log information 612 can have its own attribute. The attribute can depend on the communication category of the communication log information 612. For example, the communication category can be a received call, an outgoing call, a missed call, a received message, an outgoing message, a held message, or contents uploaded to social networking tools, such as Twitter™ and Facebook™.

The communication log information 612 can have its own attribute corresponding to one of the various communication categories previously described. Accordingly, the controller 180 can acquire the attribute of the communication log information selected by the user.

The communication contents belonging to the communication category of the selected communication log information can include details of a specific medium used to make the communication between the user of the mobile terminal 100 and the specific other party. For example, the communication log information 612 selected by the user can be first communication log information 614 belonging to the text message communication category. In this case, the controller 180 can collect communication contents corresponding to details of the first communication log information 614 from the memory 160.

The controller 180 can display the collected communication contents on the display module 151, such that the communication contents are arranged according to a specific standard. For example, communication contents can be arranged based on communication transmitting/receiving time or based on the frequency of transmitting/receiving the communication contents. For example, the controller 180 can be configured to arrange and display the communication contents on the display module 151 based on time and frequency using the same methods described above.

With reference to FIG. 6C, when the user selects the first communication log information 614, second communication contents 620 having the same attribute as that of the selected first communication log information 614 can be displayed on the display module 151. For example, if the communication category of the first communication log information 614 is the text message communication category, text messages transmitted/received to/from the other party can be displayed as the second communication contents 620. In addition, if the communication category is the text message communication category, a message input box 622 can be displayed on the display module 151.

The message input box 622 can be an input window through which the user of the mobile terminal 100 generates a message to be transmitted to the selected other party. The message input box 622 can be displayed using a similar form as the messages previously transmitted by the user of the mobile terminal 100 and in a position similar to the display position of the previously transmitted messages.

For example, text messages transmitted/received to/from the other party, such as "Christina Swift" shown in FIG. 6C, can be displayed in the form of speech balloons. Text messages received from the other party can be displayed on the left side of the display module 151 and text messages transmitted by the user of the mobile terminal 100 can be displayed on the right side of the display module 151.

As shown in FIG. 6C, the message input box 622 can be displayed at the bottom of the right side of the display module 151 with the text messages previously transmitted by the user of the mobile terminal 100. Accordingly, the user of the mobile terminal 100 can intuitively recognize the text that is input by the user of the mobile terminal 100 and a text display form.

Figure 7A:
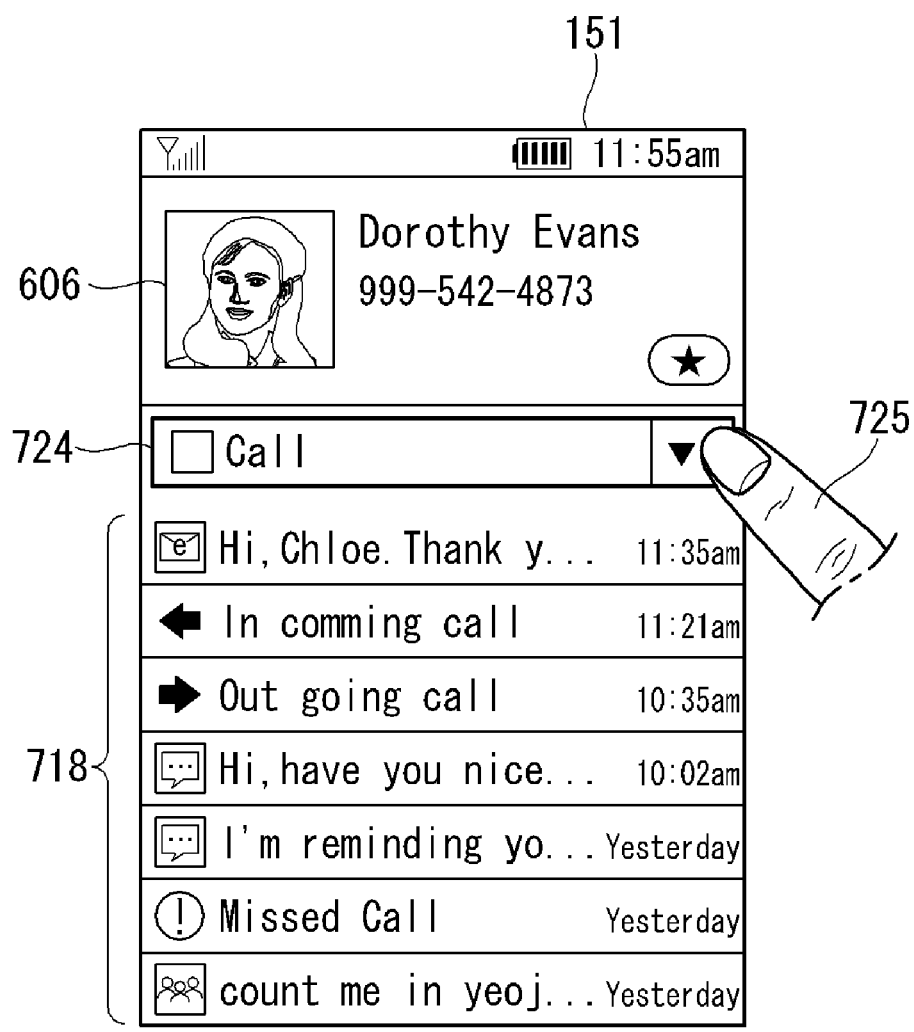
FIGS. 7A-7C are exemplary display screens of the display module showing an operation of the mobile terminal in accordance with one embodiment of the present invention.
Figure 7B:
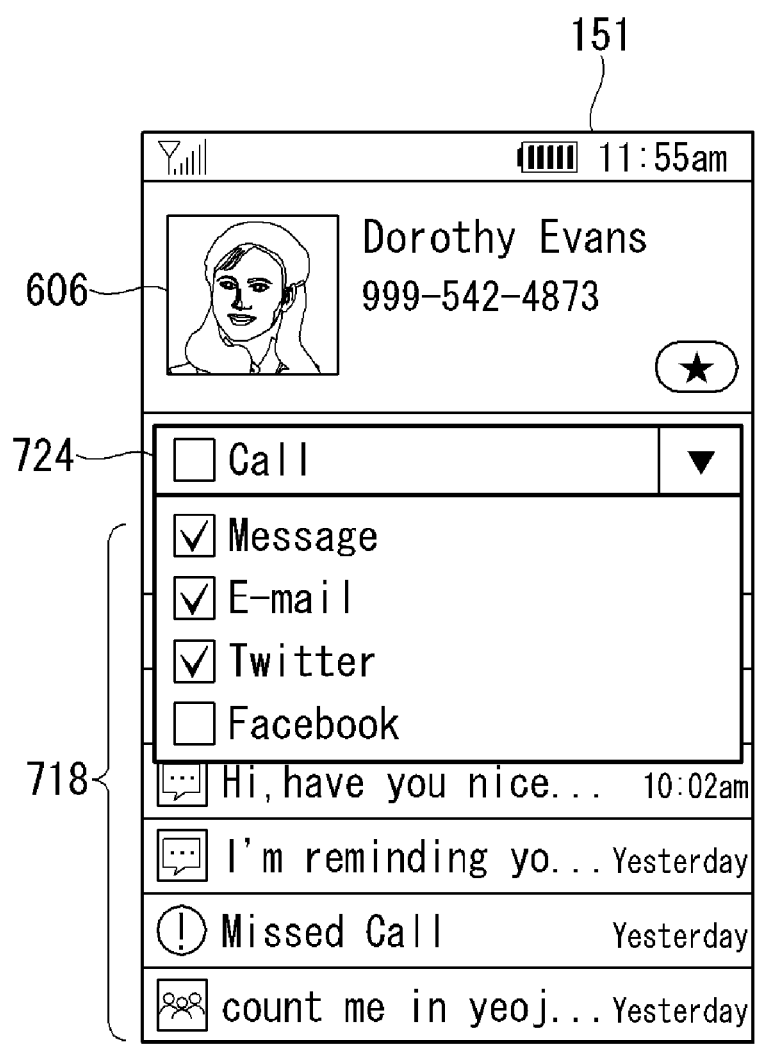
Figure 7C:
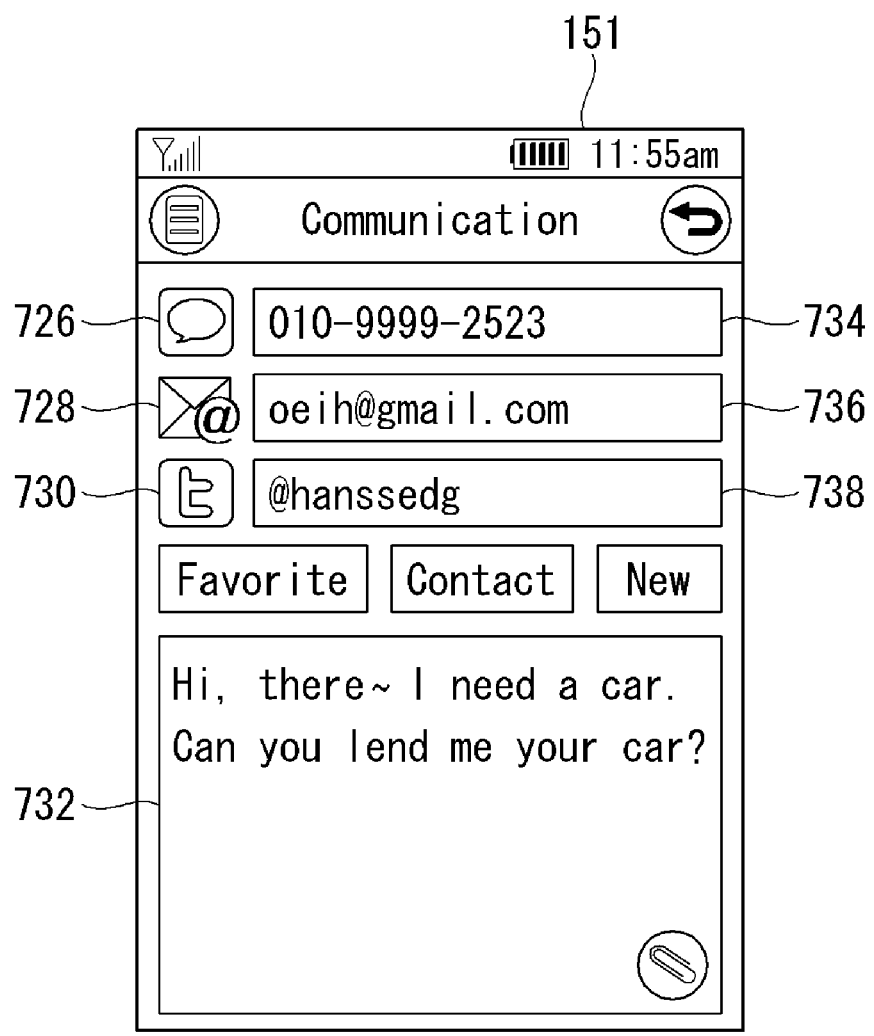

FIGS. 7A-7C are exemplary display screens of the display module 151 showing an operation of the mobile terminal 100 in accordance with one embodiment of the present invention. In the embodiment of FIGS. 7A-7C, the mobile terminal 100 can communicate with another party using communication mediums from multiple communication categories at one time.

Referring to FIG. 7A, the display module 151 can display the first communication contents 718 communicated with another party, such as "Dorothy Evans," corresponding to the first other party information 606. As shown in FIG. 7A, the display module 151 can display a drop box 724, which can be selected by the user of the mobile terminal 100 via a pointer, such as the finger 725.

Referring to FIG. 7B, various communication mediums can be displayed on the display module 151, which can be used by the user of the mobile terminal 100 to communicate with the other party corresponding to the first other party information 606, when the drop box 724 is selected. For example, at least a call, message, email or SNS information, such as Twitter™ or Facebook™ information, can be displayed in the drop box 724. The user can then select one or more of the desired communication mediums from the drop box 724.

Referring to FIG. 7C, the display module 151 can display input windows, such as input windows 734, 736 and 738, for inputting information according to the selected communication medium, such as a telephone number or an email address. As shown in FIG. 7C, for example, a message icon 726, an email icon 728 and a Twitter™ icon 730 can be displayed with the corresponding input windows to direct the user to input any appropriate information. When the user inputs the appropriate information in the input windows, written content entered by the user in a message transmission input window 732 can be transmitted to the other party via the various selected communication mediums at one time to improve user convenience.

Figure 8A:
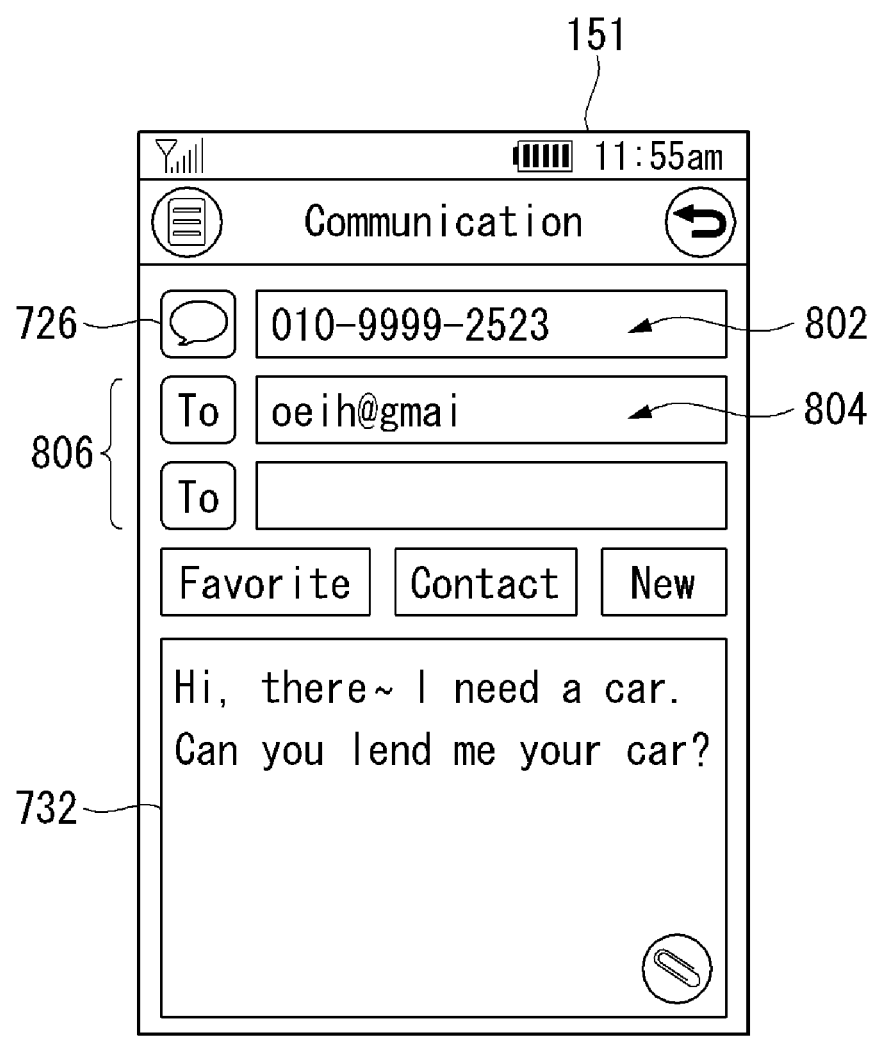
FIGS. 8A-8C are exemplary display screens of the display module showing an operation of the mobile terminal in accordance with one embodiment of the present invention.
Figure 8B:
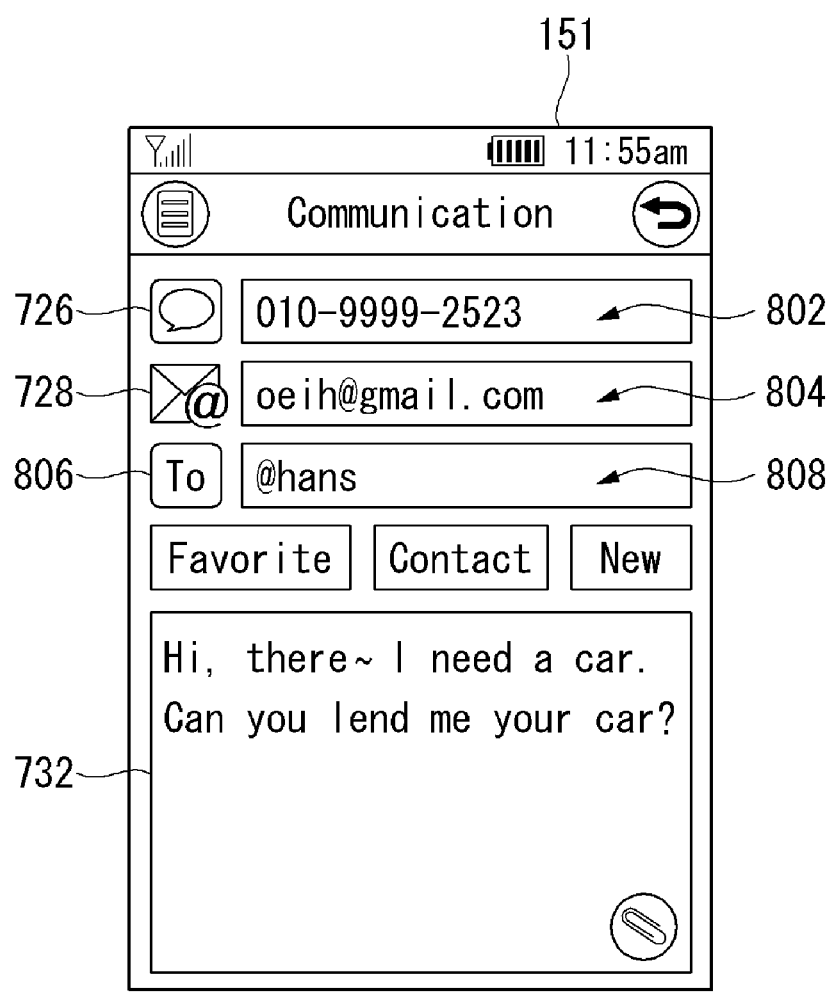
Figure 8C:
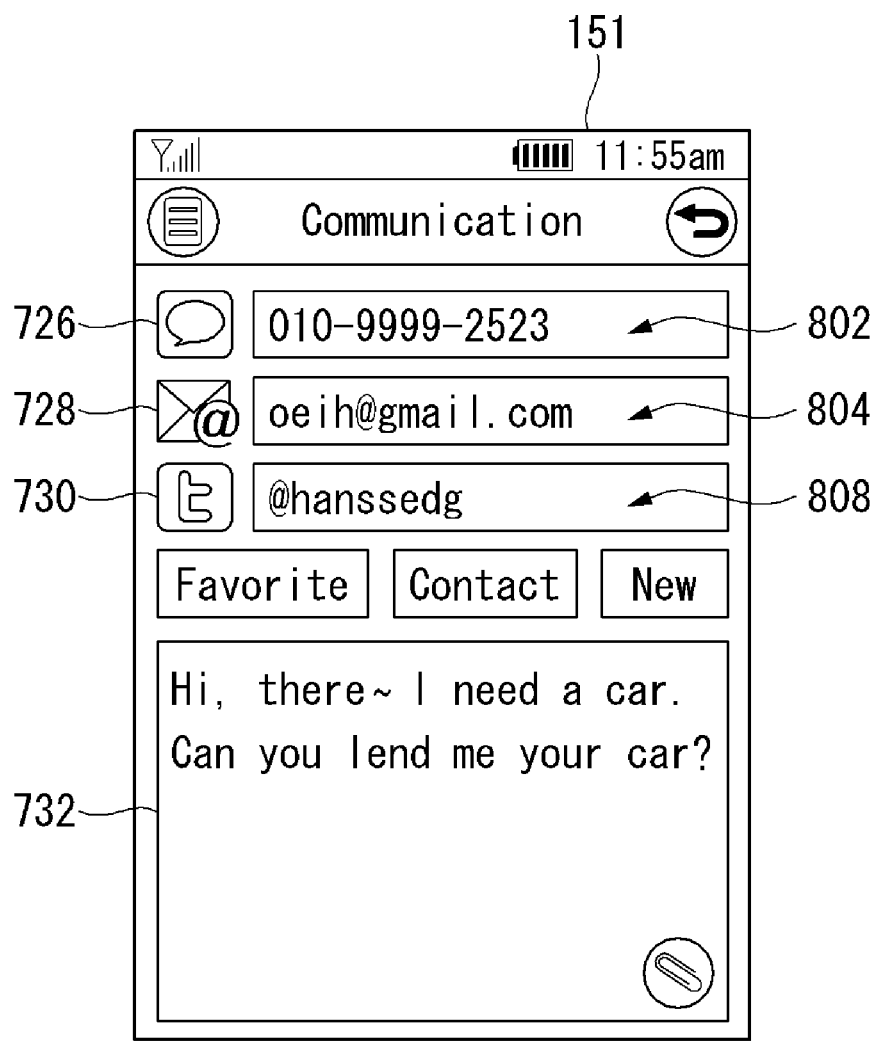

FIGS. 8A-8C are exemplary display screens of the display module 151 showing an operation of the mobile terminal 100 in accordance with one embodiment of the present invention. Referring to FIG. 8A, icons representing various communication mediums displayed in the display module 151 can be actively changed according to the type of information input by the user.

More specifically, if the user inputs a phone number 802 as transmission information in the corresponding input window, the controller 180 can recognize the input as a phone number and can display the message icon 726. In addition, the controller 180 can display an undesignated icon 806 for an input window in which no information or no appropriate information has been input by the user.

Referring to FIG. 8B, when the user inputs an email address 804 in the corresponding email input window, the email icon 728 can be displayed. Referring to FIG. 8C, when the user inputs a Twitter™ address 808, the Twitter™ icon 730 can be displayed. If required, a larger number of input windows or scroll bars can be displayed in the display module 151, such that the undesignated icon 806 can be displayed for several of the input windows.

Figure 9A:
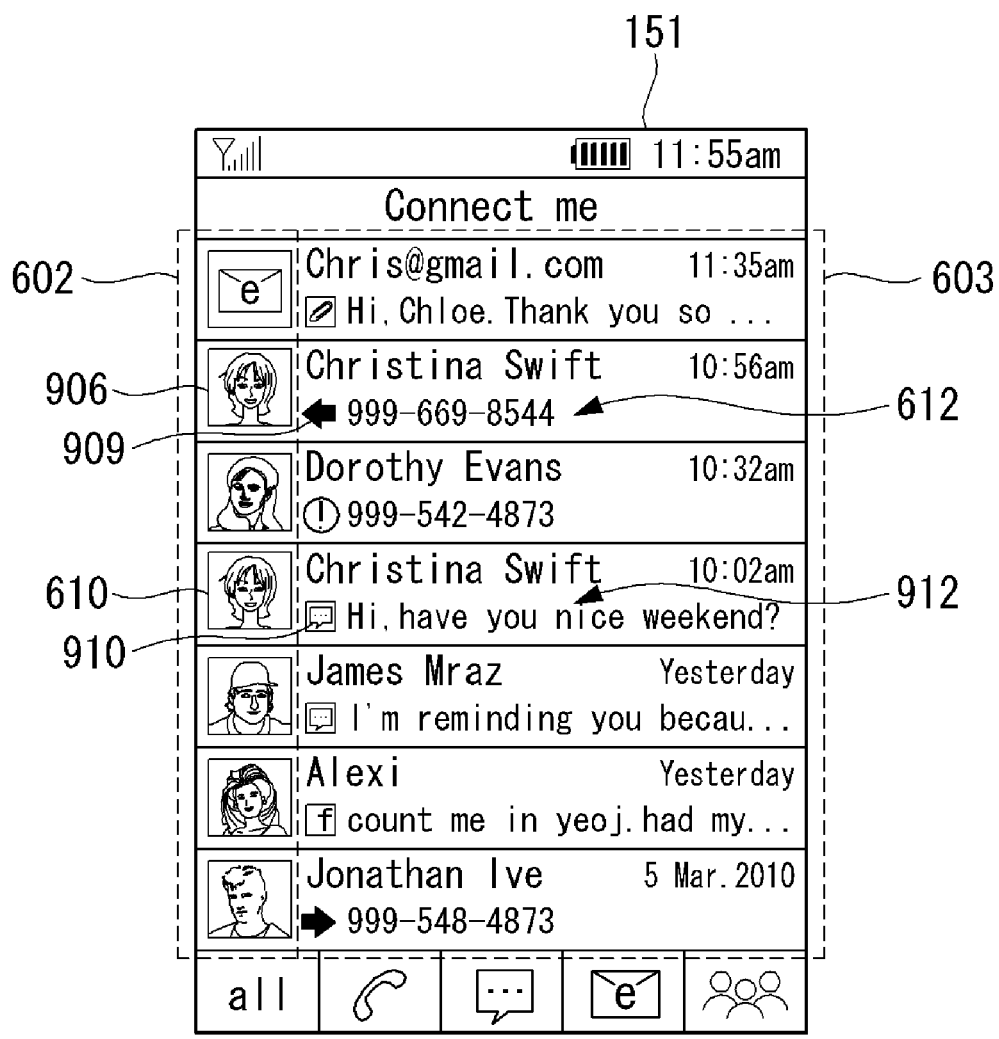
FIGS. 9A and 9B are exemplary display screens of the display module showing an operation of the mobile terminal in accordance with one embodiment of the present invention.
Figure 9B:
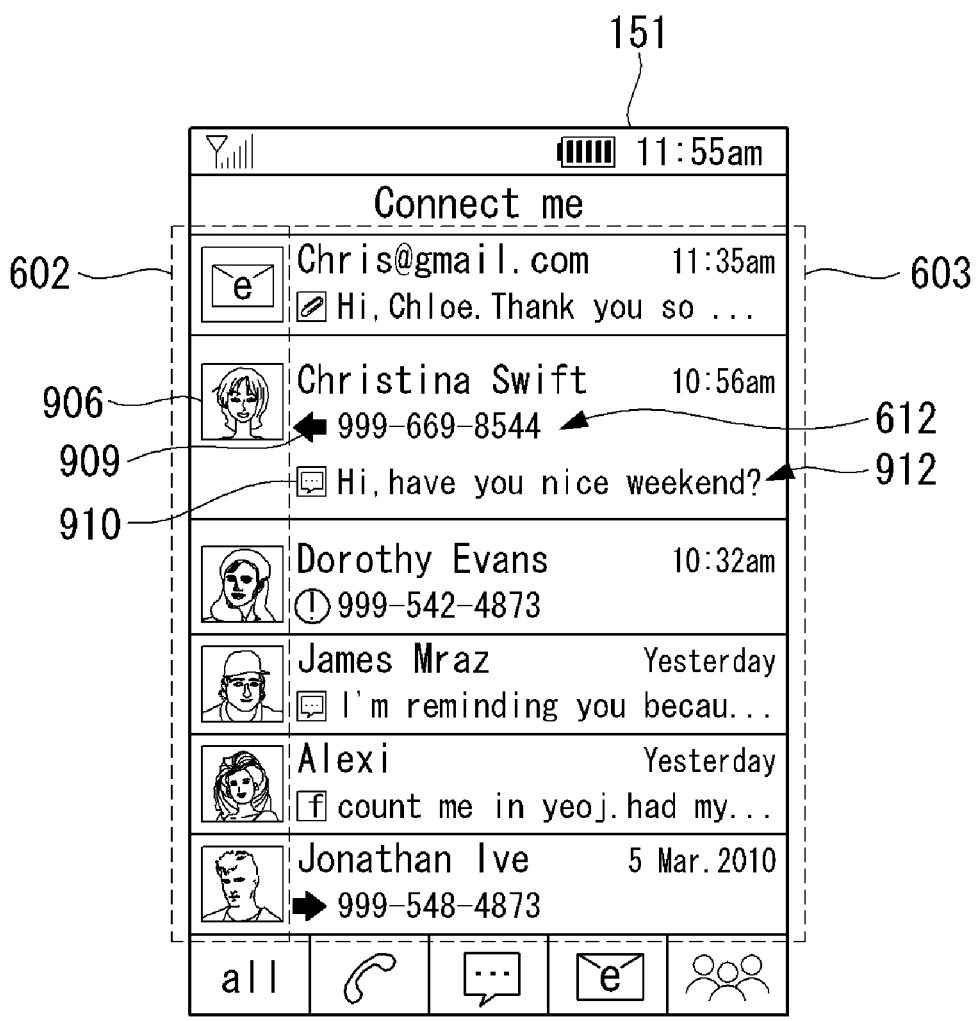

FIGS. 9A and 9B are exemplary display screens of the display module 151 showing an operation of the mobile terminal 100 in accordance with one embodiment of the present invention. In the embodiment of FIGS. 9A and 9B, the mobile terminal 100 can display the communication log information 612 and 912 in various forms in the second area 603.

Referring to FIG. 9A, when communication contents are received from a specific other party, the communication contents can be displayed in the second area 603 in a distinguishable manner. For example, if two communication contents, such as a call and a text message, are received from another party, such as "Christina Swift," the controller 180 can display communication log information 612 related to the call and the corresponding first other party information 906 separate and apart from communication log information 912 related to the text message and corresponding second other party information 610 on the display module 151.

As also shown in FIG. 9A, the mobile terminal 100 can display icons corresponding to the communication categories of the information items displayed in the second area 603. For example, the mobile terminal 100 can display a first icon 909 representing that a call has been received from the other party and a second icon 910 representing that a text message has been transmitted/received to/from the other party on the display module 151.

Referring to FIG. 9B, when communication contents are received from a specific other party, the communication contents can be integrated and displayed in the second area 603. For example, if two communication contents are received from another party, such as "Christina Swift," the first and second communication log information 612 and 912 can be displayed in the second area 603 in the region corresponding to the first other party information 906. The contents communicated with the specific other party are integrated and displayed under the first other party information 906, such that the user can conveniently view related information without performing an additional operation.

Figure 10A:
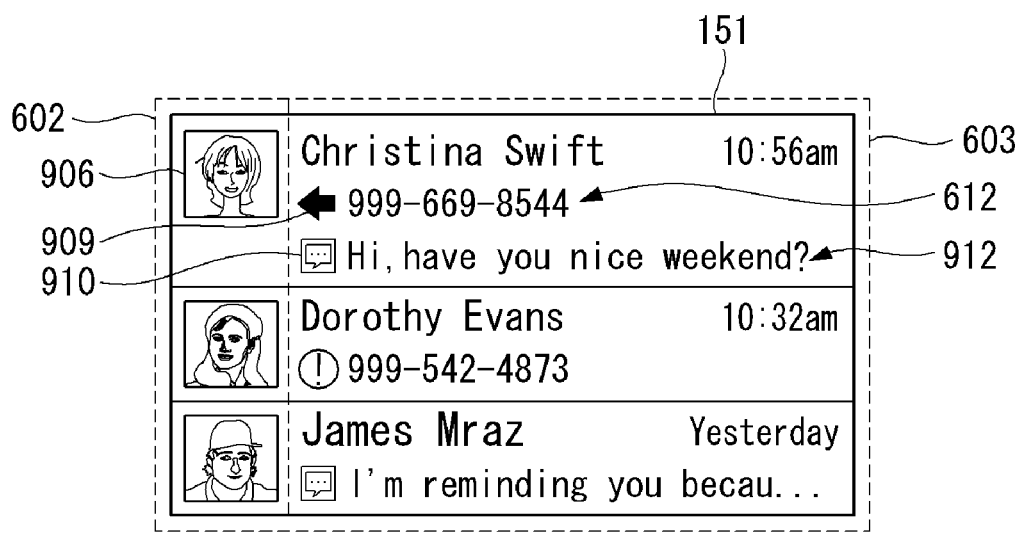
FIGS. 10A and 10B are exemplary display screens of the display module showing an operation of the mobile terminal in accordance with one embodiment of the present invention.
Figure 10B:
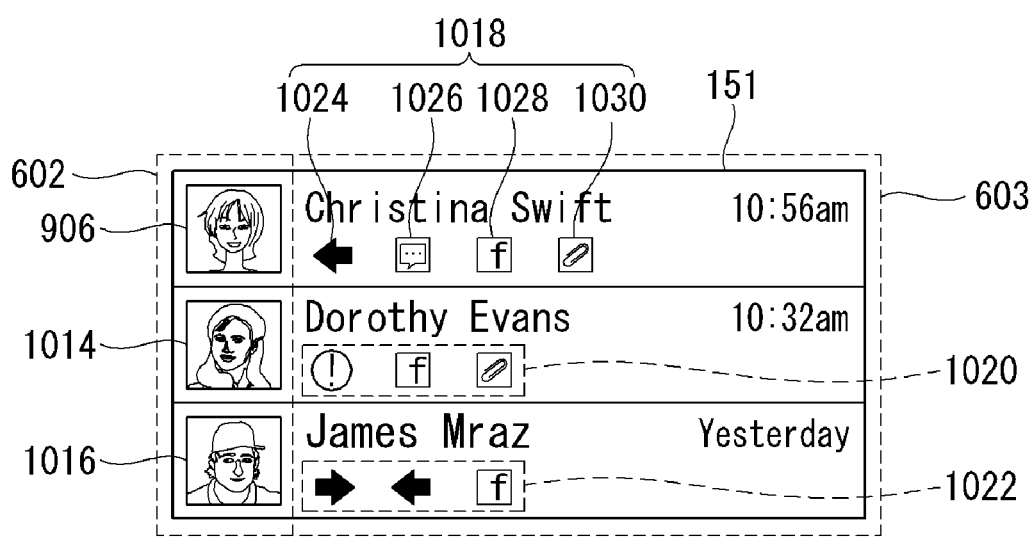

FIGS. 10A and 10B are exemplary display screens of the display module 151 showing an operation of the mobile terminal 100 in accordance with one embodiment of the present invention. In this embodiment, the mobile terminal 100 can display the communication log information, such as the communication log information 612 and 912, in various forms in the second area 603.

Referring to FIG. 10A, when information items are integrated and displayed under the first other party information 906, icons corresponding to the communication categories of the information items can be displayed. For example, the mobile terminal 100 can display a first icon 909 representing that a call has been received from the other party and a second icon 910 representing that a text message has been transmitted/received to/from the other party on the display module 151. As shown in FIG. 10A, the first communication log information 612 can be displayed next to the corresponding first icon 909, and the second communication log information 912 can be displayed next to the corresponding second icon 910.

Referring to FIG. 10B, the display module 151 can display only icons corresponding to communication log information. For example, if the other party corresponding to the first other party information 906, such as "Christina Swift," initiates events including placing a call to the mobile terminal 100, sending a text message to the mobile terminal 100, uploading a message through Facebook™, and sending an email, then the first, second, third and fourth icons 1024, 1026, 1028 and 1030 corresponding to the events initiated by the other party can be displayed. Moreover, icons corresponding to events initiated by the other parties corresponding to the second other party information 1014 and the third other party information 1016 can be displayed on the display module 151. By displaying icons to represent the communication log information corresponding to other parties, a substantial amount of information can be shown in a small display area, such as areas 1020 and 1022 in FIG. 10B.

FIGS. 11A-11D are exemplary display screens of the display module 151 showing an operation of the mobile terminal 100 in accordance with one embodiment of the present invention. In the embodiment of FIGS. 11A-11D, the mobile terminal 100 can select communication category icons 1152, 1154, 1156, 1158 and 1160 that are displayed in a third area 1150 and can selectively display only communication log information corresponding to a selected communication category.

Figure 11A:
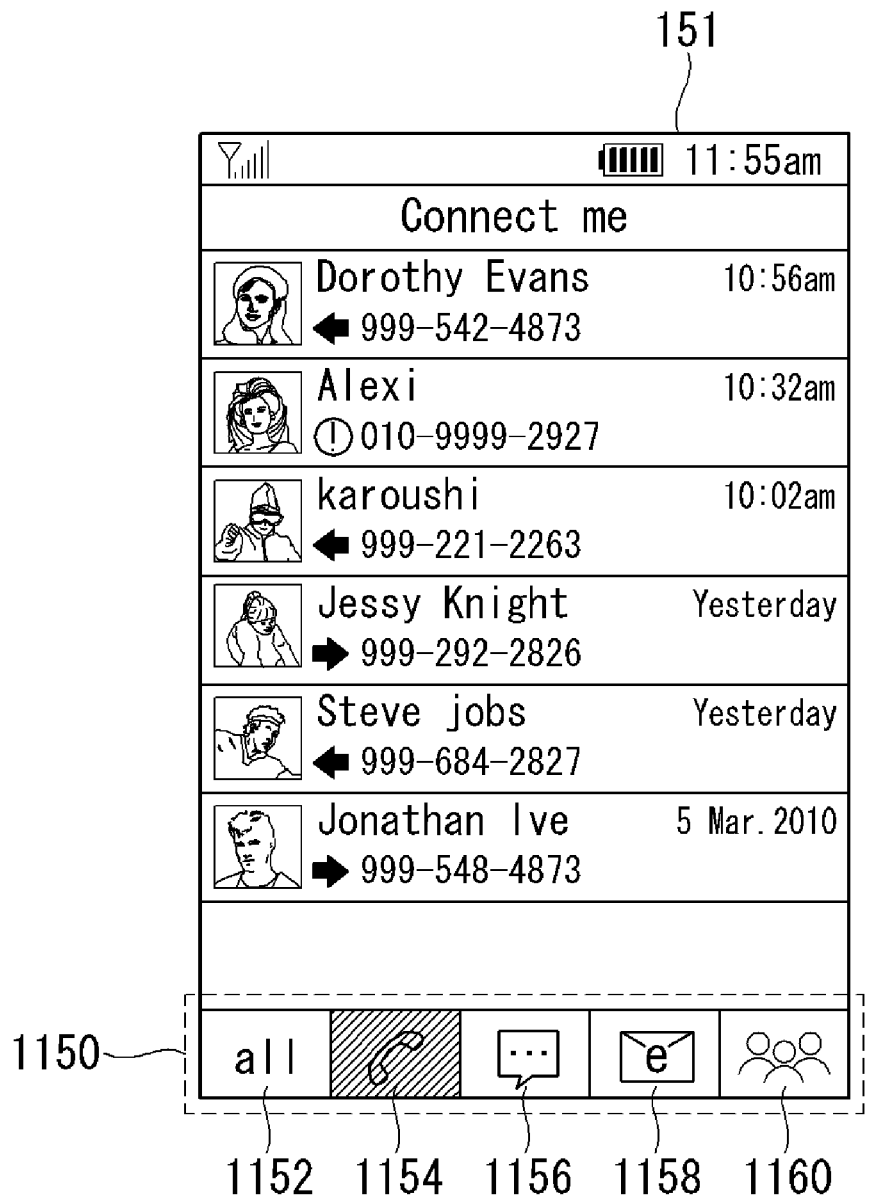
FIGS. 11A-11D are exemplary display screens of the display module showing an operation of the mobile terminal 100 in accordance with one embodiment of the present invention.
Figure 11B:
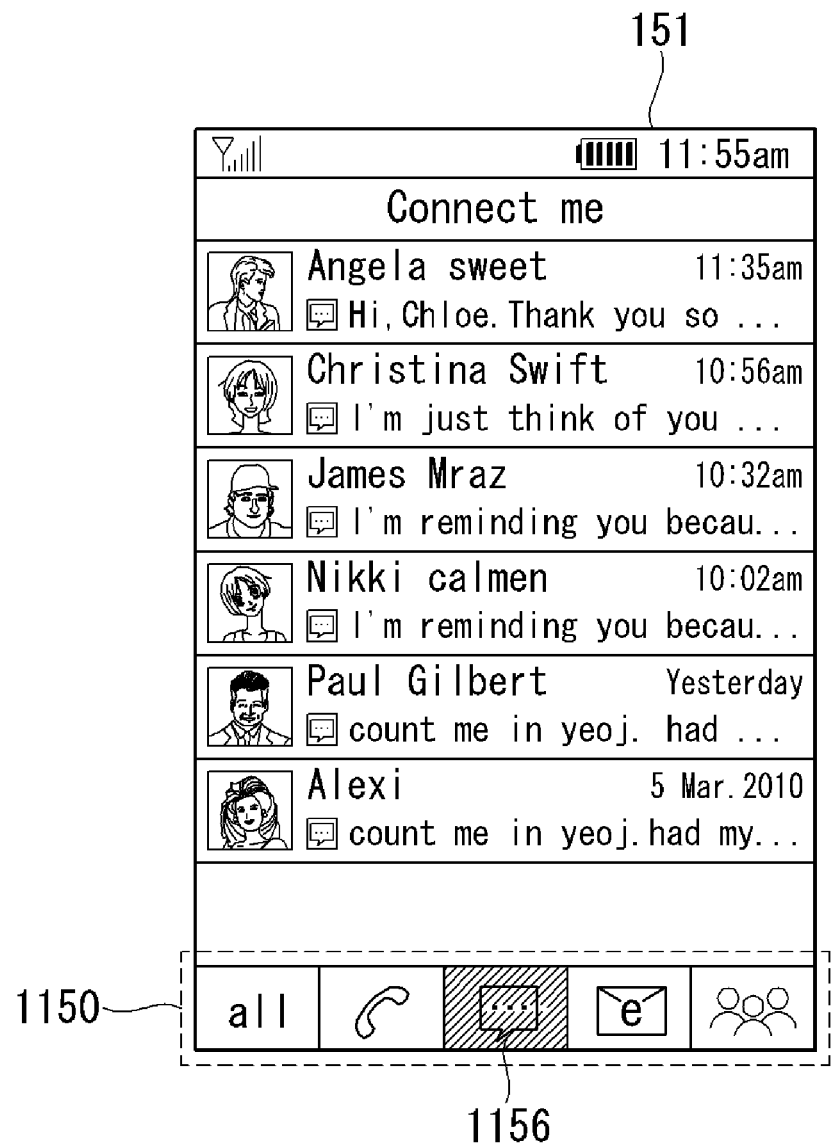
Figure 11C:
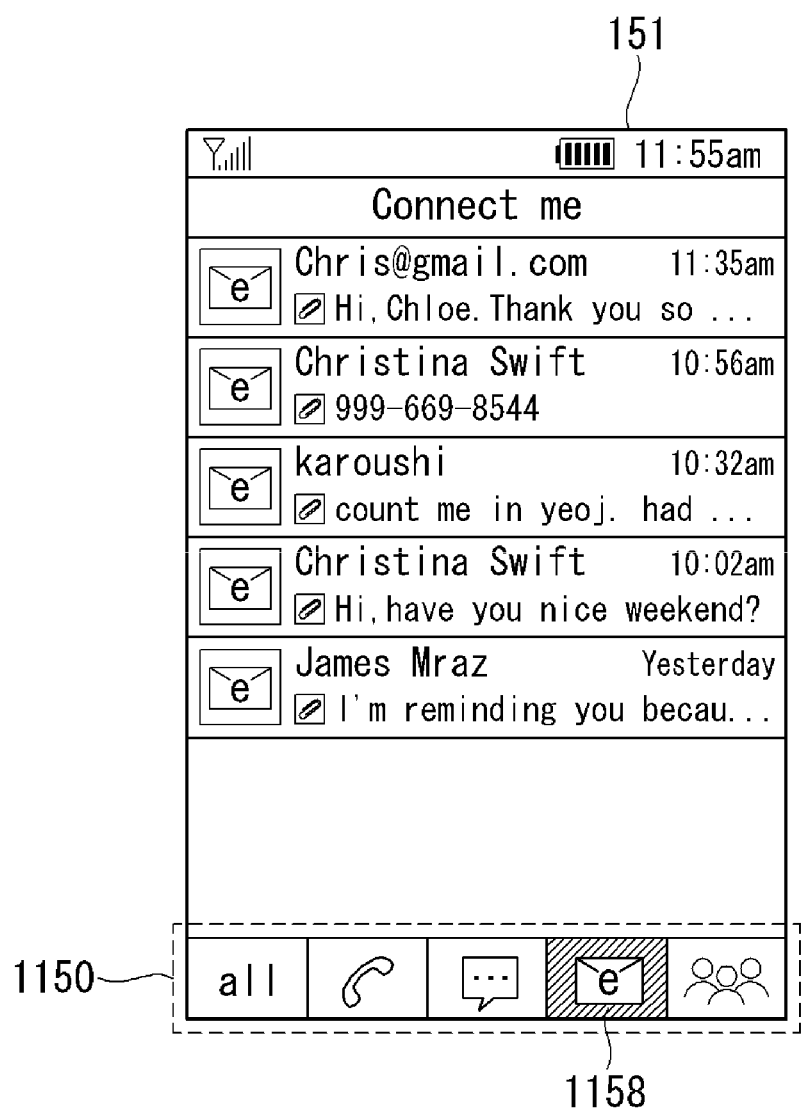
Figure 11D:
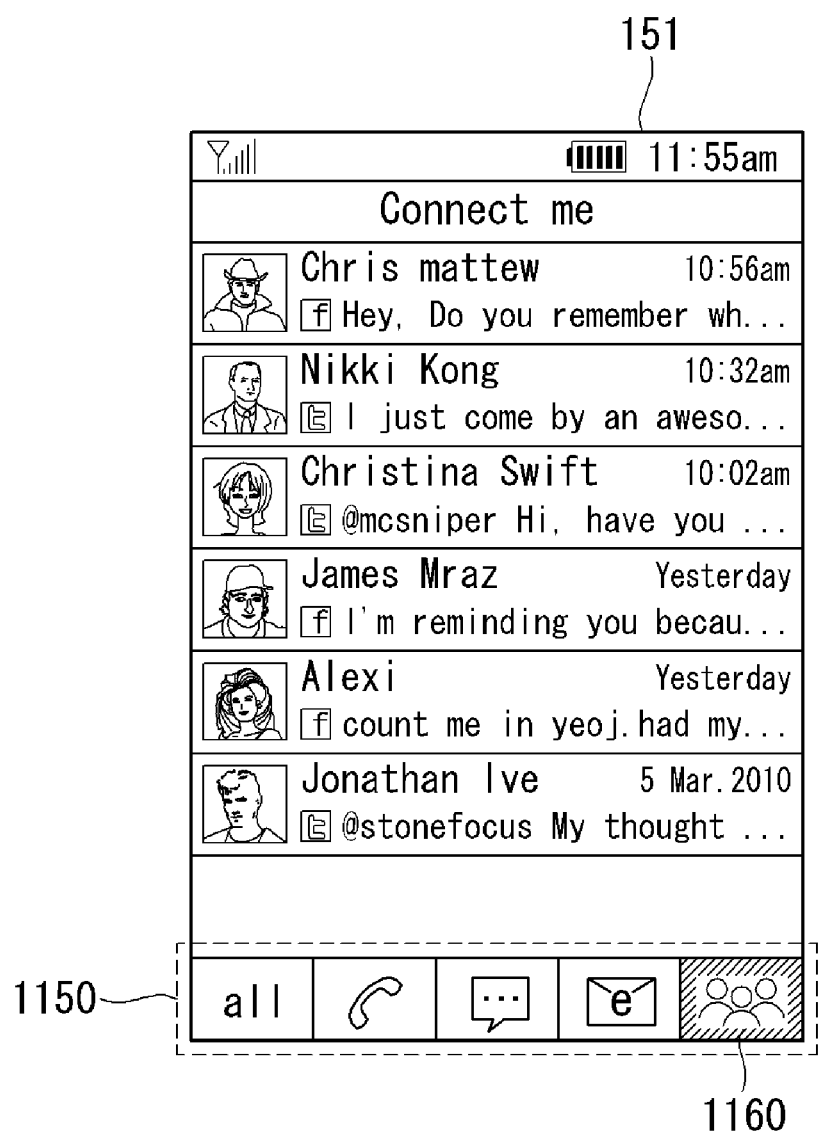

FIG. 11A shows the communication category icons 1152, 1154, 1156, 1158 and 1160 displayed in the third area 1150 on the display module 151. For example, communication log information of all communication categories can be displayed on the display module 151 when the first communication category icon 1152 is selected, and communication log information of a call communication category can be displayed on the display module 151 when the second communication category icon 1154 is selected. Furthermore, communication log information of a text message communication category can be displayed when the third communication category icon 1156 is selected, communication log information of an email communication category can be displayed when the fourth communication category icon 1158 is selected, and communication log information of an SNS communication category can be displayed when the fifth communication category icon 1160 is selected.

As shown in FIGS. 11A-11D, when the user selects a specific communication category icon, information corresponding to the selected communication category icon can be displayed on the display module 151. Accordingly, the configurations shown in FIGS. 11A-11D enables the user to easily view desired information.

Figure 12A:
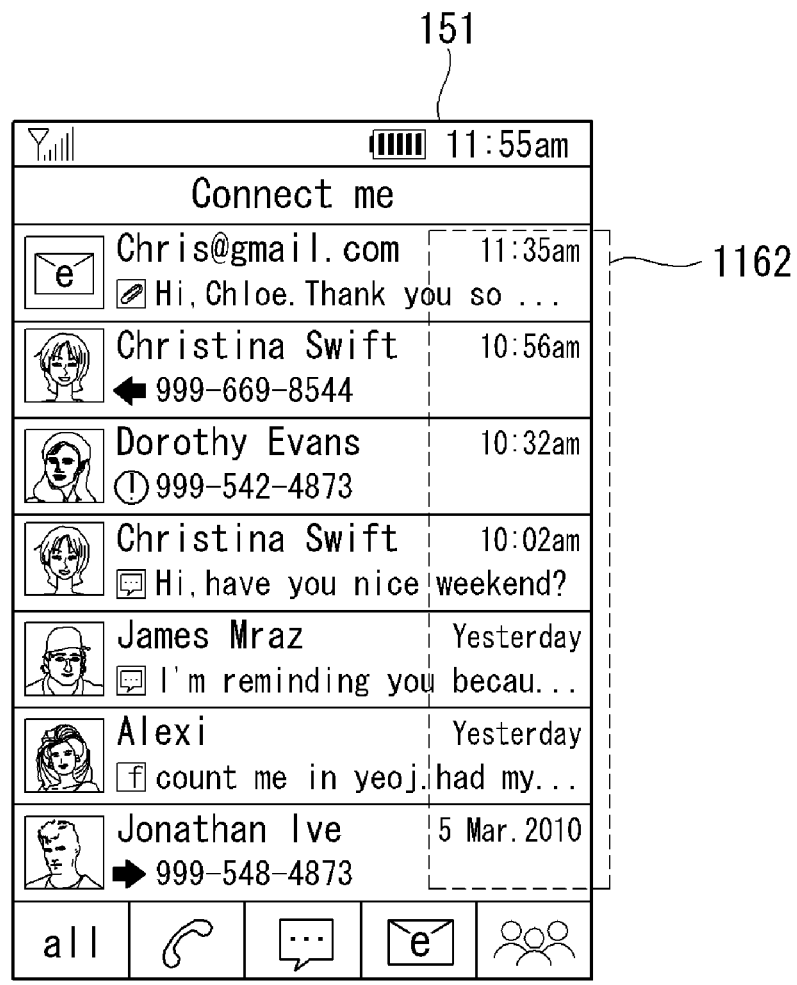
FIGS. 12A and 12B are exemplary display screens of the display module showing an operation of the mobile terminal in accordance with one embodiment of the present invention.
Figure 12B:
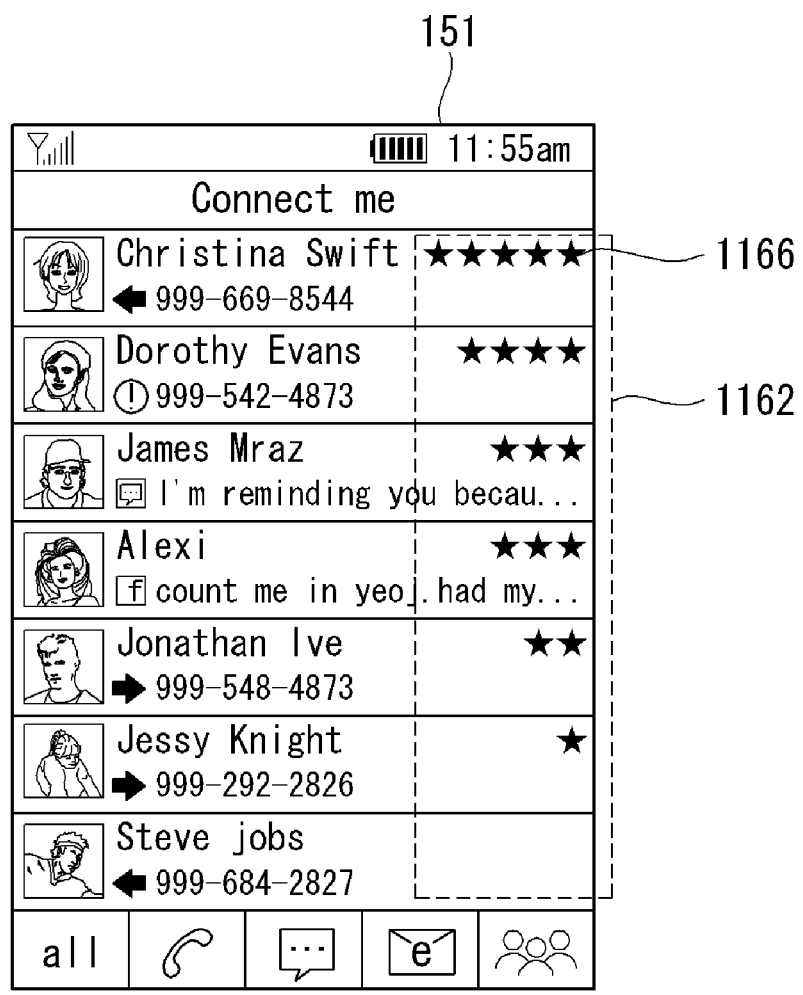

FIGS. 12A and 12B are exemplary display screens of the display module 151 showing an operation of the mobile terminal 100 in accordance with one embodiment of the present invention. In the embodiment of FIGS. 12A and 12B, the controller 180 can determine a display order of information based on predetermined standards.

Referring to FIG. 12A, for example, the predetermined communication standards can include a communication time that can be displayed in a fourth area 1162 of the display module 151. As shown in FIG. 12A, the controller 180 can display communication contents on the display module 151 in chronological order according to the communication times of corresponding communication contents. For example, older communication contents can be displayed at the bottom of the display module 151 and more recent communication contents can be displayed at the top of the display module 151.

Referring to FIG. 12B, the predetermined communication standards can include the levels of familiarity with the other parties who communicated with the user of the mobile terminal 100, and can be displayed in the fourth area 1162 of the display module 151. As shown in FIG. 12B, the controller 180 can display communication contents in an order based on the levels of familiarity, such as stars to indicate the level of familiarity 1166. For example, each of the levels of familiarity can be determined based on the number of communications with a specific other party or a familiarity value input by the user of the mobile terminal 100.

Figure 13:
FIG. 13 illustrates an operation of the mobile terminal in accordance with one embodiment of the present invention.

FIG. 13 illustrates an operation of the mobile terminal 100 in accordance with one embodiment of the present invention. In the embodiment of FIG. 13, the controller 180 of the mobile terminal 100 can set one of multiple communication mediums to a representative value.

The user of the mobile terminal 100 and a specific other party can communicate with each other via multiple communication mediums. For example, the user of the mobile terminal 100 can communicate with the other party, such as "Dorothy Evans," via telephone, email and Twitter™. The controller 180 can count the number of communications for each of the communication mediums used to communicate with Dorothy Evans.

When the most frequently used communication medium from among the available communication mediums is determined according to a count performed by the controller 180, the most frequently used communication medium can be set to the representative value. In this case, the controller 180 can communicate with Dorothy Evans via the most frequently used communication medium set to the representative value if the user of the mobile terminal 100 does not select a particular communication medium.

The methods for controlling the mobile terminal 100 described herein can be implemented as a computer program or software that can be executed by a digital microprocessor via a computer readable recording medium. The software can include code segments that perform required tasks. Programs or code segments can also be stored in a processor readable medium or can be transmitted according to a computer data signal combined with a carrier through a transmission medium or communication network.

The computer readable recording medium can be any data storage device, which can store data and be read by a computer system. Examples of the computer readable recording medium can include read-only memory (ROM), random-access memory (RAM), CD-ROMs, DVD-ROM, DVD-RAM, magnetic tapes, floppy disks, and optical data storage devices. The computer readable recording medium can also be distributed over network coupled computer systems so that the computer readable code is stored and executed in a distribution fashion.

Any reference in this specification to "one embodiment," "an embodiment," "example embodiment," etc., means that a particular feature, structure, or characteristic described in connection with the embodiment is included in at least one embodiment of this document. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
a display configured to display information; and
a controller configured to cause the display to:
display a communication log comprising a plurality of log entries, wherein each of the plurality of log entries comprises a first area for displaying an other party information item and a second area for displaying communication log information corresponding to the other party information item;
display a first set of communication contents when the other party information item is selected from the first area, wherein the first set of communication contents comprises a plurality of contents communicated between the mobile terminal and a device corresponding to the selected other party information item, the plurality of contents comprising at least two different types of contents, each of which belongs to a different communication category; and display one a second set of communication contents comprising a plurality of contents communicated between the mobile terminal and a device corresponding to a specific other party information item when specific communication log information corresponding to the specific other party information item is selected from the second area, wherein all of the plurality of contents in the second set of communication contents are same type of contents belonging to a same communication category.

2. The mobile terminal of claim 1, wherein:
the other party information item comprises identification information for identifying a user of a device corresponding to the other party information item; and
the communication log information comprises communication content communicated between the mobile terminal and the device corresponding to the other party information item.

3. The mobile terminal of claim 2, wherein:
the identification information comprises at least a picture, a video, a caricature or a name; and
the communication content comprises content generated by calling, messaging, or uploading of a message to a social network service (SNS).

4. The mobile terminal of claim 1, wherein the controller is further configured to cause the display to display at least one communication category selecting button in a third area of the display to enable input for displaying the communication log information by communication categories.

5. The mobile terminal of claim 1, wherein the controller is further configured to arrange the plurality of log entries based on a time when communication content corresponding to each of the plurality of log entries is received or transmitted.

6. The mobile terminal of claim 1, wherein the controller is further configured to arrange the plurality of log entries based on a frequency of transmitting or receiving communication content to or from a device corresponding to one of a plurality of other party information items among the plurality of log entries.

7. The mobile terminal of claim 1, wherein the controller is further configured to simultaneously transmit same content to the device corresponding to the selected other party information item via at least two different communication categories.

8. The mobile terminal of claim 7, wherein the at least two different communication categories are selected according to transmission information received from a user of the mobile terminal.

9. The mobile terminal of claim 7, wherein the controller is further configured to cause the display to display at least one icon according to the transmission information, such that each of the at least one icon represents a corresponding one of the least two communication categories.

10. The mobile terminal of claim 1, wherein the controller is further configured to:
receive a plurality of communication contents from the device corresponding to the other party information item; and
cause the display to display the communication log information corresponding to the other party information item to indicate that the plurality of communication contents has been received.

11. The mobile terminal of claim 10, wherein the controller is further configured to cause the display to display at least one icon in the second area, such that each of the at least one icon represents a corresponding communication category to which at least one of the plurality of communication contents belongs.

12. A mobile terminal comprising:
a display configured to display:
a first area for displaying a plurality of other party information items; and
a second area for displaying a plurality of communication log information, each of the plurality of communication log information corresponding to one of the plurality of other party information items, the plurality of communication log information comprising a plurality of communication categories; and
a controller configured to cause the display to:
display a plurality of communication contents corresponding to one of the plurality of other party information items in response to a first input for selecting the one of the plurality of other party information items, the plurality of communication contents comprising different types of contents belonging to different communication categories; and
display at least one communication content belonging to one of the plurality of communication categories, the one of the plurality of communication categories corresponding to specific communication log information, in response to a second input for selecting the specific communication log information associated with the one of the plurality of communication categories.

13. The mobile terminal of claim 12, wherein the controller is further configured to simultaneously transmit same content to a device corresponding to the selected one of the plurality of other party information items via at least two of the plurality of communication categories.

14. The mobile terminal of claim 13, wherein the at least two of the plurality of communication categories are selected according to transmission information received from a user of the mobile terminal.

15. The mobile terminal of claim 13, wherein the controller is further configured to cause the display to display at least one icon according to the transmission information, such that each of the at least one icon represents a corresponding one of the at least two of the plurality of communication categories.

16. A method of controlling a mobile terminal having a display, the method comprising:
displaying a communication log comprising a plurality of log entries on the display, each of the plurality of log entries comprising an other part information item and communication log information;
displaying the other party information item in a first area of the display;
displaying the communication log information corresponding to the other party information item in a second area of the display;
displaying a first set of communication contents when the other party information item is selected from the first area, wherein the first set of communication contents comprises a plurality of contents communicated between the mobile terminal and a device corresponding to the selected other party information item, the plurality of contents comprising at least two different types of contents, each of which belongs to a different communication category; and
displaying a second set of communication contents comprising a plurality of contents communicated between the mobile terminal and a device corresponding to a specific other party information item when specific communication log information corresponding to the specific other party information item is selected from the second area, wherein all of the plurality of contents in the second set of communication contents are same type of contents belonging to a same communication category.

17. The method of claim 16, wherein displaying the communication log comprises arranging the plurality of log entries based on a time when communication content corresponding to each of the plurality of log entries is received or transmitted.

18. The method of claim 16, further comprising simultaneously transmitting same content to the device corresponding to the selected other party information item via at least two different communication categories.

19. The method of claim 18, wherein the at least two different communication categories are selected according to transmission information received from a user of the mobile terminal.

20. The method of claim 18, further comprising displaying at least one icon on the display according to the transmission information, such that each of the at least one icon represents a corresponding one of the at least two communication categories.

21. The method of claim 16, further comprising:
receiving a plurality of communication contents from the device corresponding to the other party information item; and
displaying the communication log information corresponding to the other party information item to indicate that the plurality of communication contents has been received.

22. The method of claim 21, further comprising displaying at least one icon in the second area, such that each of the at least one icon represents a corresponding communication category to which at least one of the plurality of communication contents belongs.

23. The mobile terminal of claim 1, wherein the controller is further configured to cause the display to display a graphic user interface of the same communication category for communicating with the device corresponding to the specific other party information item when the specific communication log information corresponding to the specific other party information item is selected from the second area.

24. The mobile terminal of claim 1, wherein the controller is further configured to cause the display to display a graphic user interface for selecting at least one communication category to communicate with the device corresponding to the selected other party information item via the selected at least one communication category.

25. The mobile terminal of claim 12, wherein the controller is further configured to determine whether the first input or the second input is received such that the plurality of communication contents or the at least one communication content is displayed according to the received first or second input.

* * * * *